(12) United States Patent
VanderVelde

(10) Patent No.: US 12,415,343 B1
(45) Date of Patent: Sep. 16, 2025

(54) POLYPROPYLENE-BASED SHEET MATERIALS AND METHODS FOR MAKING THE SAME

(71) Applicant: Advan Packaging Systems, LLC, Columbia, SC (US)

(72) Inventor: Kenneth J. VanderVelde, Chicago, IL (US)

(73) Assignee: Advan Packaging Systems LLC, Columbia, SC (US)

( * ) Notice: Subject to any disclaimer, the term of this patent is extended or adjusted under 35 U.S.C. 154(b) by 125 days.

(21) Appl. No.: 18/226,981

(22) Filed: Jul. 27, 2023

Related U.S. Application Data

(60) Provisional application No. 63/393,058, filed on Jul. 28, 2022.

(51) Int. Cl.
*B29C 44/30* (2006.01)
*B29C 44/34* (2006.01)
(Continued)

(52) U.S. Cl.
CPC ............ *B32B 27/065* (2013.01); *B29C 44/30* (2013.01); *B29C 44/3411* (2013.01);
(Continued)

(58) Field of Classification Search
CPC ........... B32B 5/18; B32B 27/065; B32B 7/12; B32B 27/32; B32B 37/1027; B32B 37/185; B32B 2307/7376; B32B 2250/42; B32B 2255/10; B32B 2266/025; B32B 2307/4023; B32B 2323/10; B32B 5/20; B32B 37/04; B32B 37/06; B32B 37/08; B32B 37/10; B32B 37/1045; B32B 37/1054; B32B 37/1207; B32B 37/16; B32B 37/20; B32B 37/203; B32B 37/206; B32B 2037/1215; B32B 2037/1223; B32B 2038/0084; B32B 2250/03;
(Continued)

(56) References Cited

U.S. PATENT DOCUMENTS 5,725,935 A   3/1998   Rajan
5,968,624 A   10/1999  Liebe, Jr.
(Continued)

OTHER PUBLICATIONS

Maschinenfabrik Herbert Meyer Gmbh, "double belt presses with integrated heating and cooling" Http://www.meyer-machines.com/en/laminating/technology, downloaded on Aug. 16, 2023, pp. 1-7.
(Continued)

*Primary Examiner* — Michael A Tolin
(74) *Attorney, Agent, or Firm* — Additon, Pendleton & Witherspoon, P.A.

(57) ABSTRACT

Polypropylene-based sheet materials such as a polypropylene-based foam sheet material and a multilayered sheet material including the polypropylene-based foam as a layer are disclosed. The multilayered sheet material may include the polypropylene-based foam layer sandwiched between and adhered to outer polypropylene-based polymer films to provide a multilayered sheet material. The polypropylene-based foam sheet and multilayered sheet material including the polypropylene-based foam as a layer may be used in the production of printed products such as sign panels.

17 Claims, 12 Drawing Sheets

(51) Int. Cl.
| | |
|---|---|
| *B29C 44/56* | (2006.01) |
| *B29C 65/00* | (2006.01) |
| *B29C 65/02* | (2006.01) |
| *B29C 65/48* | (2006.01) |
| *B29C 71/02* | (2006.01) |
| *B32B 5/18* | (2006.01) |
| *B32B 7/12* | (2006.01) |
| *B32B 27/06* | (2006.01) |
| *B32B 27/32* | (2006.01) |
| *B32B 37/06* | (2006.01) |
| *B32B 37/08* | (2006.01) |
| *B32B 37/10* | (2006.01) |
| *B32B 37/12* | (2006.01) |
| *B32B 37/18* | (2006.01) |
| *B32B 37/20* | (2006.01) |
| *B29K 23/00* | (2006.01) |
| *B29L 7/00* | (2006.01) |
| *B29L 31/00* | (2006.01) |

(52) U.S. Cl.
CPC ......... *B29C 44/3415* (2013.01); *B29C 44/56* (2013.01); *B29C 65/02* (2013.01); *B29C 65/481* (2013.01); *B29C 66/0342* (2013.01); *B29C 66/0344* (2013.01); *B29C 66/83423* (2013.01); *B32B 5/18* (2013.01); *B32B 7/12* (2013.01); *B32B 27/32* (2013.01); *B32B 37/06* (2013.01); *B32B 37/08* (2013.01); *B32B 37/10* (2013.01); *B32B 37/1027* (2013.01); *B32B 37/1207* (2013.01); *B32B 37/185* (2013.01); *B32B 37/206* (2013.01); *B29C 2071/022* (2013.01); *B29K 2023/12* (2013.01); *B29L 2007/002* (2013.01); *B29L 2031/7232* (2013.01); *B32B 2250/40* (2013.01); *B32B 2250/42* (2013.01); *B32B 2255/10* (2013.01); *B32B 2266/025* (2013.01); *B32B 2305/022* (2013.01); *B32B 2307/4023* (2013.01); *B32B 2307/7376* (2023.05); *B32B 2323/10* (2013.01); *B32B 2590/00* (2013.01)

(58) Field of Classification Search
CPC ............ B32B 2250/05; B32B 2250/24; B32B 2250/242; B32B 2250/40; B32B 2255/102; B32B 2255/26; B32B 2305/022; B32B 2309/02; B32B 2590/00; B29C 35/02; B29C 35/16; B29C 44/20; B29C 44/22; B29C 44/24; B29C 44/30; B29C 44/32; B29C 44/321; B29C 44/3411; B29C 44/3415; B29C 44/56; B29C 65/02; B29C 65/18; B29C 65/20; B29C 65/481; B29C 65/4815; B29C 65/525; B29C 65/66; B29C 66/0342; B29C 66/0344; B29C 66/73921; B29C 66/83423; B29C 71/0063; B29C 71/0072; B29C 71/02; B29C 2071/022; B29C 2071/027; B29K 2023/10; B29K 2023/12; B29K 2023/14; B29K 2105/04; B29K 2105/046; B29L 2007/002; B29L 2031/7232

See application file for complete search history.

(56) References Cited

U.S. PATENT DOCUMENTS

| | | |
|---|---|---|
| 6,391,438 B1 | 5/2002 | Ramesh et al. |
| 6,432,512 B1 | 8/2002 | Brandolini |
| 6,462,101 B1 | 10/2002 | Ramesh et al. |
| 6,773,798 B2 | 8/2004 | Ramesh |
| 6,997,319 B2 | 2/2006 | Mahon et al. |
| 7,651,757 B2 | 1/2010 | Jones et al. |
| 8,656,675 B2 | 2/2014 | Lee et al. |
| 10,271,485 B2 | 4/2019 | Benne et al. |
| 10,543,626 B2 | 1/2020 | Bennett et al. |
| 11,276,336 B2 | 3/2022 | Schmidling et al. |
| 2005/0159496 A1* | 7/2005 | Bambara ............ B32B 37/153 521/50 |
| 2010/0249258 A1* | 9/2010 | Uno ............ B29C 55/085 521/142 |
| 2013/0147090 A1 | 6/2013 | Schromm et al. |
| 2019/0275774 A1* | 9/2019 | Matayoshi ............ C08K 3/34 |

OTHER PUBLICATIONS

Glenro Inc., "Flatbed Laminators", https://glenro.com/flatbed-laminators/, downloaded on Aug. 16, 2023, pp. 1-5.

* cited by examiner

POLYPROPYLENE-BASED SHEET MATERIALS AND METHODS FOR MAKING THE SAME

CROSS-REFERENCE TO PRIORITY APPLICATION

This application claims the benefit of U.S. Provisional Patent Application No. 63/393,058, filed Jul. 28, 2022, which is hereby incorporated by reference in its entirety.

FIELD

The present disclosure relates to polypropylene-based sheet and/or board materials that may be useful for printing and other applications, printed products such as sign panels manufactured using the same, and methods for making the same.

BACKGROUND

The printing industry has long used foamed polyvinyl chloride (PVC) boards for printing applications. There are, however, drawbacks to this product. While PVC foam board can be durable, the printed surface may be vulnerable to scratching and denting. In addition, PVC is not considered an environmentally friendly product because of the lack of recyclability of PVC and generation of undesirable pollutants during its manufacture.

Polypropylene-based products have been proposed as an alternative to PVC boards. Polypropylene-based products generally include fluted or corrugated solid polypropylene spacers sandwiched between outer polypropylene face layers. The fluted polypropylene spacers, however, can create a washboard effect on the print surface. Also, the fluted core layer includes voids that are unsightly along the board edges.

Boards including polystyrene foam core layers have also been proposed as an alternative to PVC boards. Polystyrene foam, however, is more brittle than PVC foam and also yellows upon exposure to ultraviolet light. To address yellowing, polystyrene board edges may be painted. This, however, increases manufacturing complexity and costs. In addition, many polystyrene foam composites are constructed using outer layers that are not polystyrene and thus are not readily recyclable.

Accordingly, there is a need for a viable alternative to foamed PVC-based board materials.

SUMMARY

The present disclosure is directed to polypropylene-based foam materials, multilayered sheet products (e.g., laminate and/or composite sheet materials) including a polypropylene-based foam layer, methods for making the polypropylene-based foam and/or multilayered sheet products, and products (e.g., board materials, printed products, etc.) manufactured using the same.

Polypropylene foam is not conventionally used in printing applications because of various issues or properties that render polypropylene foam unsuitable for printing applications. For example, polypropylene foam can have a surface roughness unsuitable for printing. Polypropylene foam can also have irregular properties (e.g., irregular foam thickness). As another example, lower density polypropylene foam can be produced using a circular die to form a tube, which is slit to provide a polypropylene foam sheet. The resultant foam sheet, however, can retain significant memory or curl, which can also render the polypropylene foam sheet unsuitable for printing applications.

The present inventors, however, have developed a polypropylene-based foam sheet and/or a multilayered sheet (e.g., a laminate and/or composite sheet) including the polypropylene-based foam and method of production of the same that may address these issues and provide a polypropylene-based sheet and/or a multilayered sheet (e.g., a laminate and/or composite sheet) including a polypropylene-based foam layer that is suitable for printing applications.

Exemplary polypropylene-based foam sheet materials and/or multilayered sheet materials (e.g., laminate and/or composite sheet materials) according to the present disclosure include a heat treated polypropylene-based foam layer having first and second opposing surfaces. The multilayer sheet materials of the present disclosure can further include one or more other layers in combination with the heat treated polypropylene-based foam layer. In some embodiments, the multilayer sheet materials of the present disclosure can further include a first polypropylene-based polymer film layer in a face-to-face relationship with one of the opposing surfaces of the heat treated foam layer; and a second polypropylene-based polymer film layer in a face-to-face relationship with the other of the opposing surfaces of the heat treated foam layer so that the heat treated polypropylene-based foam layer is sandwiched between the first and second polypropylene-based polymer film layers. Each of the first polypropylene-based polymer film layers and/or second polypropylene-based polymer film layers can independently include a single polypropylene-based polymer film and/or a multilayer polypropylene-based polymer film (e.g., two, three, or more polypropylene-based polymer films).

In some embodiments, the heat treated polypropylene-based foam layer is adhered to the first and second polypropylene-based polymer film layers to form the multilayered product. As a non-limiting example, the first and second polymer films may be extruded directly onto the first and second opposing surfaces, respectively, of the heat treated polypropylene-based foam layer. As another non-limiting example, the multilayered sheet (e.g., laminate and/or composite sheet) may include a first polypropylene-based bonding layer positioned between and adhering the heat treated polypropylene-based foam layer and the first polypropylene-based polymer film layer; and a second polypropylene-based bonding layer positioned between and adhering the heat treated polypropylene-based foam layer and the second polypropylene-based polymer film layer. The polypropylene-based bonding layers include a polypropylene-based material that can have an adhesive activation temperature that is generally less than the melting temperature of the polypropylene-based polymer of one or more of the polymer film layers and of the polypropylene-based polymer of the heat treated polypropylene-based foam layer (and of the polypropylene-based polymer of a precursor foam layer of the heat treated foam layer). The bonding layers accordingly can be heated to a temperature that is less than the melt temperatures of the foam layer and the film layers but sufficient to soften and activate the adhesive properties of the bonding layers so that the bonding layers adhere the first and second polypropylene-based polymer film layers to the heat treated polypropylene-based foam layer to form a multilayered sheet (e.g., a laminate and/or composite sheet) structure.

The present disclosure also relates to a method of manufacturing a heat treated polypropylene-based foam sheet and/or a multilayered sheet (e.g., a laminate and/or composite sheet materials) including the heat treated polypropylene-based foam sheet useful for printing (and other) applications. The method includes directing a precursor structure (e.g., a precursor sheet material) between a continuous upper belt and a continuous lower belt of a dual belt lamination system.

The precursor sheet material includes a precursor polypropylene-based foam layer, alone or in combination with one or more other layers. In some embodiments, the precursor structure (e.g., a precursor sheet material) can be a precursor polypropylene-based foam sheet material. In some embodiments, the precursor structure (e.g., a precursor sheet material) can be a multilayered sheet material including a precursor polypropylene-based foam sheet material in combination with one or more other layers as discussed herein. The continuous upper belt and the continuous lower belt are positioned relative to one another so that the belts cooperate to move the precursor sheet material positioned therebetween through the dual belt lamination system.

The continuous upper belt and the continuous lower belt contact and may apply downward and upward pressure to (e.g., may press against) opposite sides (e.g., upper and lower outer surfaces), respectively, of the precursor sheet material and direct the precursor material sequentially through a heating zone and a cooling zone of the belt lamination system. As the precursor material moves through the heating zone, the precursor material is heated (e.g., heat treated) at a temperature generally that is at or above a temperature sufficient to relax and/or destress the polypropylene-based polymer of the precursor foam layer (e.g., at or above a normalizing and/or annealing temperature of the polypropylene-based polymer of the foam layer), and, in some embodiments, at or above a temperature sufficient to relax and/or destress the polypropylene-based polymers of other layers when present (e.g., at or above a normalizing and/or annealing temperature of the polypropylene-based polymer of other layers when present) but is less than the melting point (melting temperature Tm) of the polypropylene-based polymer of foam layer (and less than the Tm of polypropylene-based polymers of other layers when present). In some embodiments, the method includes heating the precursor sheet material at a temperature ranging from about 270° F. to about 300° F. as the precursor sheet material moves through the heating zone.

In addition, the heating zone may include a plurality of pairs of plates positioned in series along the length of the heating zone. Each pair of plates includes an upper plate and an opposing lower plate defining a gap therebetween. The upper plate is adjacent to a surface of the continuous upper belt opposite the surface of the upper belt contacting the precursor sheet material, and the lower plate is adjacent to a surface of the continuous lower belt opposite the surface of the lower belt contacting the precursor sheet material, so that the continuous upper and lower belts, and the precursor sheet material positioned therebetween, move through the gaps between the upper and lower plates of the plurality of pairs of plates.

The upper and lower plates of each pair of plates can move together (in tandem) in a vertical direction relative to an averaged horizontal center line of a precursor sheet material path through the lamination system. In some embodiments of the present disclosure, the vertical positions of alternating pairs of plates can be adjusted upwardly and/or downwardly so that the serial arrangement of gaps between the upper and lower plates of alternating pairs of plates can alternate between positions above and/or positions below the averaged centerline of the precursor sheet material path. In this manner, the precursor sheet material may be subjected to alternating upwardly and/or downwardly movement (e.g., undulating movement) relative to the averaged centerline of the precursor sheet material path as the continuous belts move the precursor sheet material through the gaps between the upper and lower plates of alternating pairs of plates. In some other embodiments of the present disclosure, the vertical positions of the pairs of plates can be adjusted so that a serial arrangement of gaps between the upper and lower plates of the pairs of plates can be generally in alignment with the averaged centerline of the precursor sheet material path.

The heated precursor structure is then directed by the upper and lower belts through a cooling zone, where the structure is cooled to near ambient (e.g., room temperature) to "set" the properties of the resultant heat treated polypropylene-based foam sheet material and/or the multilayered sheet material including a heat treated polypropylene-based foam sheet layer.

The polypropylene-based foam sheet material and/or multilayered sheet material including a heat treated polypropylene-based foam sheet layer can be subjected to additional downstream steps, such as edge trimming and/or cutting of the sheet material to form board materials.

Without being bound by any explanation or theory, the inventors currently believe that conditions of the belt lamination method described herein (e.g., applying pressure to (e.g., pressing against) opposing surfaces of the precursor material, heating temperatures and/or the alternating upward and downward movement of the precursor material through gaps between upper and lower plates of alternating pairs of plates) may help correct various structural issues associated with precursor polypropylene-based foam sheet materials (e.g., may help reduce or eliminate thickness irregularities and/or memory or curl). Accordingly, the resultant heat treated polypropylene-based foam layer, and multilayered sheet (e.g., laminate and/or composite sheet) products including the same, may have more uniform thickness properties and/or may lay flatter, etc., as compared to the precursor product before belt lamination/heat treatment.

The heat treated polypropylene-based foam material and/or the multilayered sheet including the heat treated polypropylene-based foam material of the present disclosure may offer other benefits. For example, because polypropylene is a recyclable polymer, the heat treated polypropylene-based foam sheet and/or the multilayered sheet (e.g., laminate and/or composite sheet) including the heat treated polypropylene-based foam sheet may be recycled and thus can provide an environmentally friendly alternative to PVC-based sheet and board products.

Also, the use of outer facing polypropylene-based polymer films may provide surface smoothness properties suitable for printing applications. Different outer layers (e.g., different polypropylene-based polymer films formed of different grades of polypropylene and/or having different surface characteristics, color, etc.) may also be selected and combined to provide options and flexibility for customization of a multilayered sheet (e.g., laminate and/or composite sheet) product.

In addition, the polypropylene-based polymer materials of the foam and/or of the polymer film layers of the multilayered sheet materials (and/or of other layers) can be generally low-density polymers (e.g., can have a density of 0.90 g/cc) so that the foam layer(s), singly or in combination with other layers of the multilayered sheet materials described herein can generally have a lower density, and accordingly reduced weight, as compared to commercially available PVC foam alternatives. In some embodiments, the weight of the polypropylene-based foam sheet and/or multilayered sheet material including the polypropylene-based foam of the present disclosure may be 30 to 40% less than the weight of commercially available PVC foam alternatives. The resultant products may be light weight and provide various economic benefits, such as reduced material and shipping costs, as compared to similar sized PVC based materials.

In addition, the present inventors have also unexpectedly and surprisingly found that the present method using dual belt lamination as described herein can also expand the foam layer in the Z-direction (thickness). As non-limiting examples, the present method described herein can achieve about 10% to about 35%, for example about 10% to about 15%, and as another example about 25% to about 35%, post-expansion of the foam layer in the Z-direction. Thus, the method of the present disclosure may increase the thickness of the precursor foam sheet by about 10% to about 35%, for example about 10% to about 15%, and as another example about 25% to about 35%. (e.g., the method of the present disclosure of treating a precursor foam sheet material having a first thickness may provide a heat treated foam sheet material having a second thickness that is greater than the first thickness of the precursor foam sheet material, such as a second thickness that is about 10% to about 35%, for example about 10% to about 15%, and as another example about 25% to about 35%, greater than the first thickness of the precursor foam sheet material). In some embodiments, a precursor foam material treated in accordance with the method of the present disclosure may exhibit a higher percent expansion (e.g., about 25% to about 35% expansion) when the precursor foam material is treated closer in time to its manufacture (e.g., when a precursor foam material is treated about 5 days or less after the precursor foam sheet material is extruded). The method is also currently believed to improve thickness uniformity of the foam layer due to "thinner" sections of the foam layer expanding more and "thicker" sections of the foam layer expanding less due to compression/constraining at the thicker regions. It is also currently believed that the foam expansion can also reduce the density of the foam. For example, the foam layer (pre-lamination with one or more layers such as polymer films as described herein) may exhibit reduced foam density of about 10% to about 35%, for example about 10% to about 15% and as another example about 25% to about 35%, and about 5% to about 7% overall foam density reduction taking into account the addition of one or more other layers (e.g., the polymer films). Thus, the method of the present disclosure of treating a precursor foam sheet material having a first density may provide a foam sheet material having a second density that is less than the first density of the precursor foam sheet material (e.g., the heat treated foam material may have a second density about 10% to about 35%, for example about 10% to about 15%, and as another example about 25% to about 35%, less as compared to the first density of the precursor foam material used to make the heat treated foam material).

The present disclosure also relates to products including (manufactured from and/or using) heat treated polypropylene-based foam materials and/or multilayered sheet products including a heat treated polypropylene-based foam layer as disclosed and described herein. Examples of products produced from and/or using any of the heat treated polypropylene-based foam materials and/or multilayered sheet products including a heat treated polypropylene-based foam layer as disclosed and described herein may include without limitation boards (e.g., foam boards, also referred to as foam core boards, etc., with or without printing). Other examples of products produced from and/or using any of the heat treated polypropylene-based foam materials and/or multilayered sheet products including a heat treated polypropylene-based foam layer as disclosed and described herein (e.g., printed products, such as printed panels, etc.) may include, without limitation, sign panels; decorative panels (e.g., for home décor, interiors of recreational vehicles (RVs) that can have printed and/or textured surfaces), protective panels for interiors of recreational vehicles (RVs) that can have printed and/or textured surfaces; protective packaging applications including packaging products that can be cut and folded to custom sizes and/or shapes; food service (food container) applications wherein a closed cell foam can provide greater cleanliness and sanitation than materials that allow liquid entry; flotation products for special packaging (for example, military packaging) and/or water-recreation products; and the like.

Heat treated polypropylene-based foam materials and/or multilayered sheet products including a heat treated polypropylene-based foam layer may also be suitable for other applications, such as but not limited to applications requiring thermal insulation, e.g., boxes constructed for frozen foods, recreational coolers, etc. Multilayered sheet products useful for thermal insulation may include, for example, a heat treated polypropylene-based foam layer sandwiched between and adhered to outer polymer film layers (e.g., via polymer extrusion and/or bonding layers), such as polypropylene film layers. Other materials (in addition to or as an alternative to the polymer film layers) may also be used in combination with the heat treated polypropylene-based foam, such as but not limited to foil layers, so long as an appropriate bonding layer is used to bond the other materials to the heat treated polypropylene foam layer and/or one or more other layers of the multilayered sheet product.

The foregoing illustrative summary, other objectives and/or advantages of the present disclosure, and the manner in which the same are accomplished are further explained within the following detailed description and its accompanying drawings.

BRIEF DESCRIPTION OF THE DRAWINGS

The present invention is described hereinafter with reference to the accompanying drawings in which embodiments of the present invention are shown and in which like reference numbers indicate the same or similar elements. The drawings are provided as examples, may be schematic, and may not be drawn to scale. The present inventive aspects may be embodied in many different forms and should not be construed as limited to the examples depicted in the drawings.

DETAILED DESCRIPTION

Various aspects and features are herein described with reference to the accompanying figures. Details are set forth to provide a thorough understanding of the present disclosure. It will be apparent, however, to those having ordinary skill in the art that the disclosed polypropylene-based foam sheet and/or multilayered sheets (e.g., laminate and/or composite sheets) including the polypropylene-based foam sheet and methods for producing the same may be practiced or performed without some or all of these specific details. As another example, features disclosed as part of one embodiment can be used in another embodiment to yield a further embodiment. Sometimes well-known aspects are not described in detail to avoid unnecessarily obscuring the present disclosure. This detailed description is thus not to be taken in a limiting sense, and it is intended that other embodiments are within the spirit and scope of the present disclosure.

As used herein, terms such as sheet, web, film, laminate, board (e.g., foam board, foam core board, etc.), panel, etc. will have meanings generally understood in the art. For example, sheet (e.g., monolayer, multilayered, laminate and/or composite sheet), web, and/or film materials may generally refer to materials having a relatively larger width and length as compared to thickness (e.g., a continuous length material, the length of which may vary), and board materials may generally refer to products produced from (e.g., by cutting) a sheet (e.g., monolayer, multilayered sheet, laminate and/or composite sheet), web, and/or film to provide a product having specific dimensions. Panels (e.g., decorative panels, sign panels, etc.) may generally refer to products wherein a design is applied (e.g., printed) to an outer surface of a board material.

Figure 1:
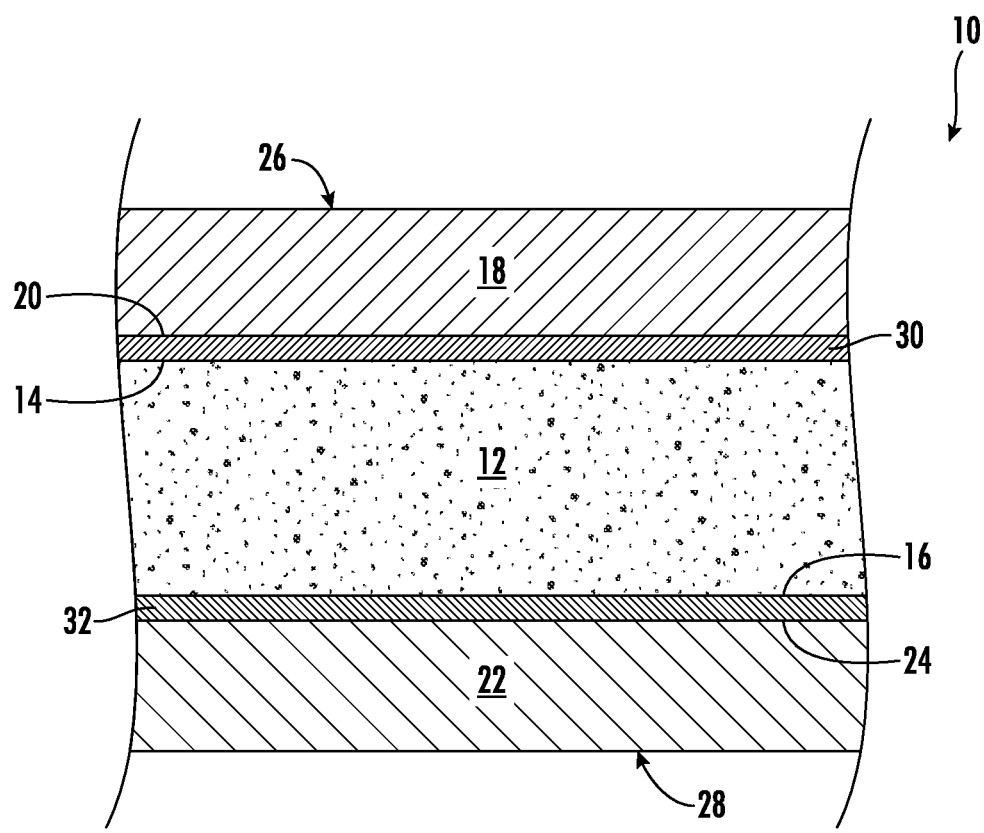
FIG. 1 is a cross sectional view of a portion of a multilayered sheet and/or board material (e.g., a composite and/or laminate sheet material) useful as a substrate for printing applications in accordance with embodiments of the present disclosure.

FIG. 1 is a cross sectional view of a portion of a multilayered sheet (e.g., a laminate and/or composite sheet) and/or board (e.g., foam board, foam core board) material 10 including a heat treated polypropylene-based foam sheet of the present invention that may be useful as a substrate for printing applications, such as but not limited to the production of panels (e.g., decorative panels, sign panels, etc.), in accordance with embodiments of the present disclosure. The multilayered sheet 10 useful for printing applications such as sign panels includes an inner layer 12 (e.g., a core layer) having opposing first and second surfaces 14 and 16, respectively. It is also again noted that the present disclosure is not limited to multilayered materials and that some embodiments are directed to the heat treated polypropylene-based foam layer itself.

The inner layer 12 comprises a heat treated polypropylene-based foam. The heat treated polypropylene-based foam can be a closed cell foam material. The term "closed cell" foam is used herein in its conventional sense and the skilled artisan will understand the meaning of the same. As non-limiting examples, closed cell foam may include foam comprising an open cell content of 30 volume % or less, for example, 20% or less, 10% or less, 5% or less, 1% or less or 0%. measured according to ASTM D2856-94 (Procedure A), which is incorporated herein in its entirety by reference. The foam material may have an average cell size ranging from about 0.005 to about 1.0 mm, for example from about 0.01 mm to about 0.2 mm, without limitation. The average cell size may be measured according to ASTM D3576-98 (Procedure A), which is incorporated herein in its entirety by reference.

The heat treated polypropylene-based foam layer of the present disclosure can have any desired thickness to suit the intended application. For example, in some embodiments, the heat treated polypropylene-based foam layer can be in the form of a sheet having a thickness ranging from about 0.6 mm to about 8.0 mm, for example from about 2.5 to about 3.0 mm, and as another example about 2.6 mm, without limitation. Thinner or thicker heat treated polypropylene-based foam layers are also included within the scope of the presently disclosed subject matter.

As discussed in more detail herein, the thickness of a precursor (untreated) polypropylene-based foam material (e.g., sheet) may unexpectedly expand about 10% to about 35%, for example about 10% to about 15%, and as another example about 25% to about 35%, when processed in accordance with the method of the present disclosure. The resultant heat treated polypropylene-based foam material (e.g., sheet) of the present disclosure (e.g., heat treated polypropylene-based foam layer 12) accordingly may have an increased thickness (e.g., may have about 10% to about 35%, for example about 10% to about 15%, and as another example about 25% to about 35%, increased thickness) as compared to the thickness of its precursor foam material. This is an unexpected benefit and a result contrary to expectations of industry experts on polypropylene foam.

After being processed in accordance with the method described herein, the expanded polypropylene-based foam material (e.g., sheet) of the present disclosure may also have a reduced density relative to the density of its precursor (untreated) foam material (e.g., sheet). Generally, the density of the heat treated polypropylene-based foam material of the present disclosure may vary depending on the requirements of a particular end use (e.g., the requirements for a sign panel made using the same). For example, in some embodiments, the density of the heat treated polypropylene-based foam material of the present disclosure (e.g., after heat treatment as discussed in more detail herein) can range from about 42 kg/m$^3$ to about 250 kg/m$^3$, without limitation. In contrast, the density of a precursor (untreated) polypropylene-based foam material (before heat treatment) can range from about 50 kg/m$^3$ to about 300 kg/m$^3$, without limitation. The density may be measured according to ASTM D3575-00, Suffix W, Test Method A, which is incorporated herein in its entirety by reference.

The heat treated polypropylene-based foam layer may be a rigid foam layer having a flexural modulus sufficient to withstand the expected handling and use conditions of the multilayered sheet material including the heat treated polypropylene-based foam layer. The flexural modulus of the heat treated polypropylene-based foam layer according to the present disclosure can vary and may be engineered, for example, by selecting various properties such as foam thickness and/or foam density, thickness of the multilayered sheet, and/or filler modification of the multilayer sheet.

Generally, polypropylene-based foam sheet materials can have a relatively rough surface. The method of the present disclosure may modify the surface texture (e.g., reduce surface roughness, increase surface smoothness) of a precursor (untreated) foam material. Accordingly, at least a portion of (e.g., substantially the entirety of) one, or both, of outer surfaces 14, 16, of the heat treated polypropylene-based foam layer 12 may have reduced surface roughness, as compared to the surface roughness of its precursor (untreated) foam material.

As also discussed herein, the method for manufacturing the heat treated polypropylene-based foam material (and/or a multilayered sheet including the same) may improve various properties of the foam. The heat treated polypropylene-based foam material of the present disclosure may have more uniform thickness, may lay flatter, and/or may have a smoother surface, as compared to the precursor polypropylene-based foam material.

As a non-limiting example, "flatness" across a width (e.g., across an eight-inch span) of a precursor polypropylene-based foam material can be measured by placing the precursor polypropylene-based foam material on a horizontal flat surface and measuring the distance of the highest point of the precursor polypropylene-based foam material from the flat surface (also reported as the maximum out-of-plane bowing of the precursor polypropylene-based foam material). Similarly, flatness across a width (e.g., across an eight-inch span) of a heat treated polypropylene-based foam material of the present disclosure (produced by heat treating the precursor polypropylene-based foam material according to the method of the present disclosure discussed in more detail herein) can be measured by placing the heat treated polypropylene-based foam material of the present disclosure on a horizontal flat surface and measuring the distance of the highest point of the heat treated polypropylene-based foam material from the flat surface (also reported as the maximum out-of-plane bowing of the polypropylene-based foam material of the present disclosure). The heat treated polypropylene-based foam material of the present disclosure can be flatter than the precursor polypropylene-based foam material (e.g., can have a maximum out-of-plane bowing across a width thereof that is less than the maximum out-of-plane bowing of the precursor polypropylene-based foam material).

In some embodiments such as depicted in FIG. 1, the multilayered sheet material 10 further includes a first polymeric (e.g., polypropylene-based) film layer 18 having a first surface 20 adjacent to (e.g., in a face-to-face relationship with, adhered to, etc.) the first surface 14 of the heat treated polypropylene-based foam layer 12. In some embodiments, the multilayered sheet material 10 as depicted in FIG. 1 may also include a second polymeric (e.g., polypropylene-based) film layer 22 having a first surface 24 adjacent to (e.g., in a face-to-face relationship with, adhered to, etc.) the second surface 16 of the heat treated polypropylene-based foam layer 12 so that the heat treated propylene-based foam layer 12 is disposed between and adhered to the first and second polymeric film layers 18 and 22, respectively.

The first polypropylene-based film layer 18 has a second surface 26 opposite the first surface 20 thereof. In some embodiments such as depicted in FIG. 1, the second surface 26 can form at least a portion of a first outer surface of the multilayered sheet material 10. The second polypropylene-based film layer 22 also has a second surface 28 opposite the first surface 24 thereof. In some embodiments such as depicted in FIG. 1, the second surface 28 can form at least a portion of a second outer surface of the multilayered sheet material 10.

At least a portion of (e.g., substantially the entirety of) one, or both, of outer surfaces 20, 26 and/or 24, 28 of polypropylene-based polymer film layers 18 and/or 22, respectively, can be treated to provide desired surface properties, such as surface smoothness, finish, ink receptivity/adhesion, etc. As non-limiting examples, the polymer film may be surface treated (e.g., embossed, corona treated) and/or may include an additive as known in the art to provide a desired smoothness (e.g., an average surface roughness Ra suitable for printing applications) and/or finish (e.g., a matte finish, satin finish, glossy finish) and/or improve ink adhesion. The polypropylene-based polymeric film layer(s) can also be customized (e.g., using one or more polymer additives) with respect to color, whiteness/brightness, UV stability (to minimize yellowing/prevent material degradation), and the like.

The polypropylene-based polymer films can have any desired thickness to suit the intended application. For example, in some embodiments, the polypropylene-based polymer films can have a thickness ranging from about 0.05 mm to about 1.0 mm, for example about 0.2 mm, without limitation. Thinner or thicker polypropylene-based polymer films are also included within the scope of the presently disclosed subject matter.

The multilayered sheet material 10 can further include at least one or more bonding layers, such as bonding layers 30 and 32 depicted in FIG. 1, to bond or adhere various layers of the multilayered sheet material to one another to form a unitary multilayered sheet structure. Bonding layers 30, 32 may comprise a polypropylene-based polymer having a lower melting point (melting temperature $T_m$) than the melting point of the polypropylene-based polymer(s) of the polypropylene-based film layers 18 and/or 22. The bonding layer(s) may be formed of the same or different lower melt temperature polypropylene-based polymers. In some embodiments, the bonding layers 30, 32 may comprise a polypropylene-based polymer modified with functional material (e.g., maleic anhydride and/or any other suitable materials). Suitable polypropylene-based polymers modified with functional materials are known in the art and are commercially available. The bonding layer(s) may be formed of the same or different polypropylene-based polymer modified with a functional material. In some embodiments, the bonding layer(s) may be formed of the same or different mixtures (combinations) of polypropylene-based polymers modified with a functional material.

In some embodiments such as depicted in FIG. 1, bonding layer 30 may be positioned between the first surface 14 of the foam layer 12 and the first surface 20 of the first film layer 18, and bonding layer 32 may be positioned between the second opposite surface 16 of the foam layer 12 and the first surface 24 of the second polymer film layer 22. In the embodiment of FIG. 1, bonding layers 30 and 32 function to adhere the foam layer 12 to the first and second polymer films 18 and 22, respectively, to provide a cohesive multi-layered sheet structure.

Generally, the polypropylene-based polymer of the bonding layer(s) (e.g., bonding layers 30 and/or 32) has an adhesion activation temperature that is less than the melting point ($T_m$) of the polypropylene-based polymer of foam layer 12 and of film layers 18 and 22. The bonding layers accordingly can be heated to a temperature that is less than the melt temperatures of the foam layer and the film layers but sufficient to soften and activate the adhesive properties of the bonding layers so that the bonding layers can adhere the foam layer and the film layers to form a cohesive multilayered sheet structure.

In some embodiments, a polymer film/bonding layer laminate may include about 60% to about 90% polymer film and about 10% to 40% bonding layer, for example about 80% polymer film and about 20% bonding layer. The present disclosure, however, is not so limited and a polymer film/bonding layer laminate having other polymer film/bonding layer ratios are also included within the scope of the presently disclosed subject matter. The polypropylene-based bonding layer can have a thickness suitable for an intended application and which is technically feasible (e.g., as a practical matter, a functional polymer film/bonding layer laminate can be manufactured). For example, in some embodiments, the polypropylene-based bonding layers can have a thickness ranging from about 0.005 mm to about 0.40 mm, for example about 0.08 mm, without limitation. Thinner or thicker polypropylene-based bonding layers are also included within the scope of the presently disclosed subject matter.

In some embodiments, the polypropylene-based polymer film layer 18 and polypropylene-based bonding layer 30 may be provided as a coextruded product, in which the polypropylene-based bonding material may be applied (e.g., extruded, coated, etc.) to at least a portion (e.g., the entirety) of a surface of the polypropylene-based polymer film 18 to form a bonding layer 30 (e.g., a patterned layer, a substantially continuous coating, etc.) on the surface of the polymer film 18. Similarly, in some embodiments, the polypropylene-based polymer film layer 22 and polypropylene-based bonding layer 32 may be provided as a coextruded product, in which the polypropylene-based bonding material may be applied (e.g., extruded, coated, etc.) to at least a portion (e.g., the entirety) of a surface of the polypropylene-based polymer film 22 to form a bonding layer 32 (e.g., a patterned layer, a substantially continuous coating, etc.) on the surface of the polymer film 22.

As a non-limiting example, FIG. 1 can be said to depict an embodiment wherein: polypropylene-based bonding layer 30 is comprised of a polypropylene-based polymer film layer (referred to herein as polypropylene-based polymer film layer 30); polypropylene-based polymer film layer 18 and polypropylene-based polymer film layer 30 are a coextruded film product; and polypropylene-based polymer film layer 18 can include a polypropylene-based polymer having a higher melting point relative to a melting point of a polypropylene-based polymer of polypropylene-based polymer film layer 30 (e.g., film 18 can include a "high melt" polypropylene-based polymer and film 30 can include a "low melt" polypropylene-based polymer).

FIG. 1 further can be said to depict an embodiment wherein: polypropylene-based bonding layer 32 is comprised of a polypropylene-based polymer film layer (referred to herein as polypropylene-based polymer film layer 32); polypropylene-based polymer film layer 22 and polypropylene-based polymer film layer 32 are a coextruded film product; and polypropylene-based polymer film layer 22 can include a polypropylene-based polymer having a higher melting point relative to a melting point of a polypropylene-based polymer of polypropylene-based polymer film layer 32 (e.g., film 22 can include a "high melt" polypropylene-based polymer and film 32 can include a "low melt" polypropylene-based polymer).

Thus, FIG. 1 can also be described as depicting a cross-sectional view of a portion of an embodiment of a multi-layered sheet (e.g., a laminate and/or composite sheet) and/or board (e.g., foam board, foam core board) material 10 having at least the following layers: coextruded film layer including high melt polypropylene-based polymer film layer 18 and low melt polypropylene-based polymer film layer 32 (which can act as a bonding layer)/heat treated polypropylene-based foam layer 12/coextruded film layer including low melt polypropylene-based polymer film layer 32 (which also can act as a bonding layer) and high melt polypropylene-based polymeric film layer 22.

In alternative embodiments, the first and/or second polymer films 18 and 22 may be adhered to the foam layer by laminating a polypropylene-based polymer film (e.g., a monolayer lamination film) directly to or extruding a polypropylene-based polymer directly onto the first and/or second opposing surfaces 14 and 16, respectively, of the heat treated polypropylene-based foam layer 12 (and/or onto opposing surfaces of a precursor polypropylene-based foam layer of the heat treated polypropylene-based foam layer 12), to form polymer films 18 and/or 22 (e.g., bonding layers 30 and/or 32 may not be present).

Figure 9:
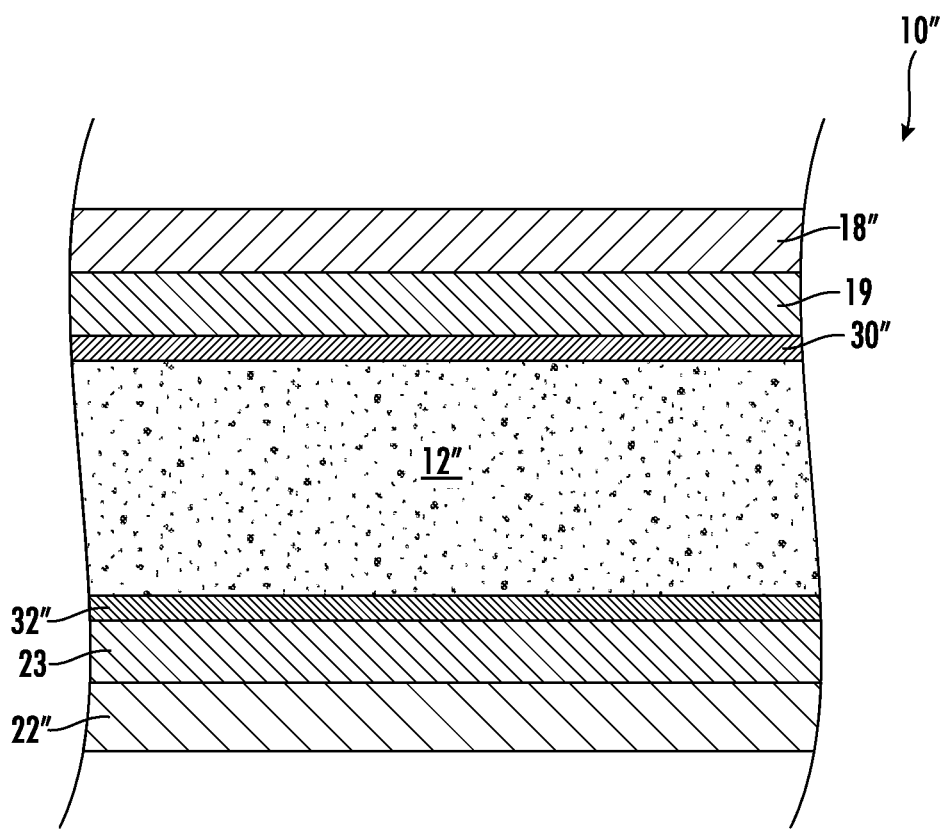
FIG. 9 is a cross sectional view of a portion of a multilayered sheet and/or board material (e.g., a composite and/or laminate sheet material) useful as a substrate for printing applications in accordance with other embodiments of the present disclosure.

FIG. 9 is a cross-sectional view of a portion of another embodiment of a multilayered sheet (e.g., a laminate and/or composite sheet) and/or board (e.g., foam board, foam core board) material 10" having seven layers: polypropylene-based polymer film layer 18"/polypropylene-based polymer film layer 19/polypropylene-based bonding layer 30"/heat treated polypropylene-based foam layer 12"/polypropylene-based bonding layer 32"/polypropylene-based polymeric film layer 23/polypropylene-based polymeric film layer 22". The polypropylene-based polymer of the polypropylene-based bonding layers 30" and 32" can have an adhesion activation temperature that is less than the melting point of the polypropylene-based polymer of one or both of the polypropylene-based polymer film layers 18" and 22". The polypropylene-based polymer of the polypropylene-based bonding layers 30" and 32" can also have an adhesion activation temperature that is less than the melting point of the polypropylene-based polymer of the polypropylene-based foam layer 12" and/or one or both of the polypropylene-based polymer of the polypropylene-based polymer film layers 19 and 23. The bonding layers accordingly can be heated to a temperature that is less than the melt temperatures of the foam layer and the film layers but sufficient to soften and activate the adhesive properties of the bonding layers so that when the bonding layer(s) is heated, it can soften and adhere the foam layer and the film layer(s) to form a cohesive multilayered sheet structure.

In some embodiments, each of the polypropylene-based polymer film layers 18", 19, 22" and/or 23 can include the same or different polypropylene-based polymer(s) as defined herein (e.g., each can include virgin polypropylene-based polymer(s)). In some embodiments, each of the polypropylene-based polymer film layers 19 and/or 23 can include the same or different polypropylene-based regrind material(s). In some embodiments, each of the polypropylene-based polymer film layers 19 and/or 23 can include mixtures of the same or different virgin polypropylene-based polymer(s) and polypropylene-based regrind material(s). Regrind material is known in the art and can include, for example, polypropylene-based polymer materials that have been processed at least once before, such as pre-consumer materials including web scrap and/or sheet edge trim, etc. from the manufacturing of the material(s) described herein.

In some embodiments, the polypropylene-based polymer film layer 18"/polypropylene-based polymer film layer 19/polypropylene-based bonding layer 30" may be provided as a coextruded product, in which the polypropylene-based bonding material may be applied (e.g., extruded, coated, etc.) to at least a portion (e.g., the entirety) of a surface of the polypropylene-based polymer film 19 to form a bonding layer 30" (e.g., a patterned layer, a substantially continuous coating, etc.) on the surface of the polymer film 19. In some embodiments, the polypropylene-based polymer film layer 22" polypropylene-based polymer film layer 23/polypropylene-based bonding layer 32" may be provided as a coextruded product, in which the polypropylene-based bonding material may be applied (e.g., extruded, coated, etc.) to at least a portion (e.g., the entirety) of a surface of the polypropylene-based polymer film 23 to form a bonding layer 32" (e.g., a patterned layer, a substantially continuous coating, etc.) on the surface of the polymer film 23.

As a non-limiting example, FIG. 9 can be said to depict an embodiment wherein: polypropylene-based bonding layer 30" is comprised of a polypropylene-based polymer film layer (referred to herein as polypropylene-based polymer film layer 30"); polypropylene-based polymer film layer 18", polypropylene-based polymer film layer 19, and polypropylene-based polymer film layer 30" are a coextruded film product; polypropylene-based polymer film layer 19 can include a polypropylene-based polymer regrind material, alone or in combination with virgin polypropylene-based polymer material; and polypropylene-based polymer film layer 18" can include a polypropylene-based polymer having a higher melting point relative to a melting point of a polypropylene-based polymer of polypropylene-based polymer film layer 30" (e.g., film 18" can include a "high melt" polypropylene-based polymer and film 30" can include a "low melt" polypropylene-based polymer).

FIG. 9 further can be said to depict an embodiment wherein: polypropylene-based bonding layer 32" is comprised of a polypropylene-based polymer film layer (referred to herein as polypropylene-based polymer film layer 32"); polypropylene-based polymer film layer 22", polypropylene-based polymer film layer 23, and polypropylene-based polymer film layer 32" are a coextruded film product; polypropylene-based polymer film layer 23 can include a polypropylene-based polymer regrind material, alone or in combination with virgin polypropylene-based polymer material; and polypropylene-based polymer film layer 22" can include a polypropylene-based polymer having a higher melting point relative to a melting point of a polypropylene-based polymer of polypropylene-based polymer film layer 32" (e.g., film 22" can include a "high melt" polypropylene-based polymer and film 32" can include a "low melt" polypropylene-based polymer).

Thus, FIG. 9 can also be described as depicting a cross-sectional view of a portion of an embodiment of a multilayered sheet (e.g., a laminate and/or composite sheet) and/or board (e.g., foam board, foam core board) material 10" having at least the following layers: coextruded film layer including high melt polypropylene-based polymer film layer 18", polypropylene-based polymer film layer 19 including polypropylene-polymer based regrind material, and low melt polypropylene-based polymer film layer 32" (which can act as a bonding layer)/heat treated polypropylene-based foam layer 12"/coextruded film layer including low melt polypropylene-based polymer film layer 32" (which also can act as a bonding layer), polypropylene-based polymer film layer 23 including polypropylene-polymer based regrind material, and high melt polypropylene-based polymeric film layer 22".

The present disclosure is not limited to the embodiments depicted in FIGS. 1 and/or 9. For example, in some embodiments, the present disclosure is directed to a heat treated polypropylene-based foam layer as described herein, such as foam layer 12. In some embodiments, the present disclosure is directed to a sheet material including (e.g., consisting of) one layer of a heat treated polypropylene-based foam layer as described herein, such as foam layer 12. In some embodiments, the present disclosure is directed to a sheet material including (e.g., consisting of) more than one (a plurality of, e.g., two, three, four, five, six, etc.) heat treated polypropylene-based foam layer(s) as described herein, such as foam layer 12. In some embodiments, the present disclosure is directed to a multilayered sheet material including one or more (e.g., one, two, three, four, five, six, etc.) heat treated polypropylene-based foam layers as described herein, such as foam layer 12 and/or 12", in combination with one or more (e.g., one, two, three, four, five, six, etc.) other layers. In some embodiments, the present disclosure is directed to a multilayered sheet material 10 that can have at least three layers: polypropylene-based polymeric film layer 18/heat treated polypropylene-based foam layer 12 (which can be a closed cell foam layer)/polypropylene-based polymeric film layer 22. In some embodiments, the present disclosure is directed to a multilayered sheet material 10 that can have at least five layers: polypropylene-based polymeric film layer 18/polypropylene-based bonding layer 30/heat treated polypropylene-based foam layer 12 (which can be a closed cell foam layer)/polypropylene-based bonding layer 32/polypropylene-based polymeric film layer 22. In some embodiments, the present disclosure is directed to a multilayered sheet material 10" that can have at least seven layers: polypropylene-based polymer film layer 18"/polypropylene-based polymer film layer 19/polypropylene-based bonding layer 30"/heat treated polypropylene-based foam layer 12" (which can be a closed cell foam layer)/polypropylene-based bonding layer 32"/polypropylene-based polymeric film layer 23/polypropylene-based polymeric film layer 22".

More generally, the multilayered sheet (e.g., laminate and/or composite sheet) of the present disclosure such as laminate and/or composite sheet 10 and/or 10" can have different numbers and/or types of layers. As non-limiting examples, the multilayered sheet according to the present disclosure such as laminate and/or composite sheet 10 and/or 10" may include one or more additional polymeric foam (e.g., one or more heat treated polyethylene-based polymer foam layers according to the present disclosure), film, bonding, and/or coextruded layers (e.g., one, two, three, four, or more of any of polymeric foam, film, bonding, and/or coextruded layers). In addition, or as an alternative, in other non-limiting examples, one or more layers such as one or more of the polymeric film, bonding, and/or coextruded layers can be omitted, so long as the multilayered sheet includes at least one heat treated polypropylene-based foam layer and at least one additional layer, such as a polypropylene-based polymeric film layer. In some non-limiting examples, the multilayered sheet (e.g., laminate and/or composite sheet) may include one or more monolayer lamination films (e.g., one or more polypropylene-based monolayer films without a bonding layer) adhered to one or both opposing surfaces of a heat treated polypropylene-based polymer foam layer(s); one or more polypropylene-based polymer layer(s) extrusion coated onto one or both opposing surfaces of a heat treated polypropylene-based polymer foam layer(s); and/or wet (paint-like) coating(s) applied to one or both opposing surfaces of a heat treated polypropylene-based polymer foam layer(s) and/or other outermost layers of the multilayered sheet (e.g., to smooth and promote print adhesion).

Still further, in some embodiments, the multilayered sheet material may include one or more layers formed of a material other than polypropylene, such as but not limited to metal foil, polymer films formed of a polymer other than polypropylene, polymer bonding layers formed of a polymer other than polypropylene (e.g., EVA, EMA, EMAA, etc. bonding layers), etc. For example, although the disclosure of multilayered sheet materials herein is directed generally to products including polypropylene-based polymer films as the outermost layers, the present disclosure is not so limited and outer layers formed of materials other than polypropylene may be used, for example, by including bonding layers having an appropriate chemistry selected to bond the outer layers to a polypropylene layer (e.g., to a polypropylene-based polymer film, polypropylene-based bonding layer, and/or heat treated polypropylene-based foam layer).

In some embodiments, the multilayered sheet may include metal foil layers as the outermost layers, in place of or in addition to the polypropylene-based polymer films described herein. In such embodiments, the multilayered sheet material may include an outermost metal foil layer, wherein the metal foil layer is pre-laminated to a polymer film (e.g., a polypropylene film) using known chemistries. For example, the multilayered sheet material may have a structure such as: a metal foil layer/a tie layer formed of a material other than polypropylene that can promote bonding between polypropylene and materials of other chemistries such as the metal foil layer, such as a EVA, EMA, EMAA, etc. tie layer/a polypropylene-based polymer film/a polypropylene-based bonding layer/a heat treated polypropylene-based polymer polypropylene-based foam layer/a polypropylene-based bonding layer/a polypropylene-based polymer film/a tie layer such as a EVA, EMA, EMAA, etc. tie layer/a metal foil layer. In other such embodiments, the multilayered sheet material may include: a metal foil layer/a tie layer formed of a material other than polypropylene that can promote bonding between polypropylene and materials of other chemistries such as the metal foil layer, such as a EVA, EMA, EMAA, etc. tie layer/a polypropylene-based bonding layer/a heat treated polypropylene-based foam layer/a polypropylene-based bonding layer/a tie layer such as a EVA, EMA, EMAA, etc. tie layer/a metal foil layer. In still other such embodiments, the multilayered sheet material may include: a metal foil layer/a tie layer formed of a material other than polypropylene that can promote bonding between polypropylene and materials of other chemistries such as the metal foil layer, such as an EVA, EMA, EMAA, etc. tie layer/a heat treated polypropylene-based foam layer/a tie layer such as an EVA, EMA, EMAA, etc. tie layer/a metal foil layer.

As used herein, the term "polypropylene-based" polymer refers to polypropylene homopolymers and/or copolymers (e.g., virgin and/or regrind polypropylene homopolymers and/or copolymers), including high melt strength (HMS) polypropylene polymers and/or copolymers. Polypropylene copolymers may include one or more olefin comonomers and/or rubbery (elastomeric) monomers such as ethylene, butene, pentene, hexene, and the like. Polypropylene copolymers can include propylene as the majority monomer component. In some embodiments, a polypropylene copolymer may include greater than about 50 wt %, for example at least about 60 wt %, for example at least about 70 wt %, for example at least about 80 wt %, as another example at least about 90 wt %, propylene monomer, or any ranges or values therebetween, based on the total weight of the polypropylene copolymer. As used herein, as will be understood by the skilled artisan, the term "(co)polymer" refers to a homopolymer and/or a copolymer.

In some embodiments, the heat treated polypropylene-based foam layer is formed of an HMS polypropylene (co)polymer.

Exemplary polypropylene-based (co)polymers useful in the production of the heat treated polypropylene-based foam sheet material and/or the multilayered sheet (e.g., laminate and/or composite sheet) materials including the heat treated polypropylene-based foam of the present disclosure are known in the art and are commercially available. Different layers of the multilayered sheet materials (e.g., heat treated foam, film, bonding, and/or coextruded layer(s)) may independently include (e.g., be formed of) the same or different polypropylene-based (co)polymers, including the same or different mixtures and/or combinations of polypropylene (co)polymers. Generally, a polymer film/bonding layer laminate can be produced using extrusion grade polypropylene-based (co)polymers, which generally have a lower melt flow rate than injection grade polypropylene-based (co)polymers.

Generally, the heat treated polypropylene-based foam sheet material and/or each of the heat treated polypropylene-based foam layer 12 and the polypropylene-based polymeric film layers 18, 30, 22, and 32 of the multilayered sheet 10 and/or each of the heat treated polypropylene-based foam layer 12" and the polypropylene-based polymeric film layers 18", 19, 30", 22", 23, and 32" of the multilayered sheet 10" can comprise, consist of, or consist essentially of polypropylene (co)polymer(s). For example, for one or more of, or each of, the heat treated polypropylene-based foam layer 12 and the polypropylene-based polymeric film layers 18, 30, 22, and 32, and/or for one or more of, or each of, the heat treated polypropylene-based foam layer 12" and the polypropylene-based polymeric film layers 18", 19, 30", 22", 23, and 32", at least about 90% by weight of the polymeric material of the layer can be polypropylene (co)polymer, at least about 93% by weight of the polymeric material of the layer can be polypropylene (co)polymer, at least about 96% by weight of the polymeric material of the layer can be polypropylene (co)polymer, at least about 98% by weight of the polymeric material of the layer can be polypropylene (co)polymer, at least about 99% by weight of the polymeric material of the layer can be polypropylene (co)polymer, at least about 99.5% by weight of the polymeric material of the layer can be polypropylene (co)polymer, at least about 99.9% by weight of the polymeric material of the layer can be polypropylene (co)polymer, 100% by weight of the polymeric material of the layer can be polypropylene (co)polymer, at least about 90% by weight of the layer can be polypropylene (co)polymer, at least about 93% by weight of the layer can be polypropylene (co)polymer, at least about 96% by weight of the layer can be polypropylene (co)polymer, at least about 98% by weight of the layer can be polypropylene (co)polymer, at least about 99% by weight of the layer can be polypropylene (co)polymer, at least about 99.5% by weight of the layer can be polypropylene (co)polymer, at least about 99.9% by weight of the layer can be polypropylene (co)polymer, 100% by weight of the layer can be polypropylene (co)polymer, or any ranges or values therebetween.

The polypropylene-based polymer of the foam layer, film layers, and/or bonding layers can include one or more various additives as known in the art. Examples of additives include without limitation calcium carbonate, nucleating agents (e.g., zinc oxide, zirconium oxide, silica, talc, and the like), colorants (dyes and/or pigments such as titanium dioxide as a whitening agent), fillers, antioxidants, flame retardants, antistatic agents, lubricants, foaming aids, and the like and mixtures thereof. Such additives well known to those of ordinary skill in the art and the skilled artisan can determine appropriate amounts thereof depending on the desired properties of the foam, film, and/or bonding layer.

For example, additive(s) can be added to one or more polymer film layers such as film layers 18, 30, 22, and/or 32 of FIG. 1 and/or film layers 18", 19, 30", 22", 23, and/or 32" of FIG. 9 to customize properties such as color, whiteness/brightness, UV protection, ink receptivity, tensile strength, melt temperature, and the like. One or more of the polymer films can also be customized using known techniques and/or additives to provide different levels of finishes for printing (e.g., flat, matte, satin, glossy). The polymer films can have the same or different properties (e.g., the same or different color, whiteness/brightness, UV protection, ink receptivity, tensile strength, melt temperature, surface finish, etc.). As yet another example, the polypropylene-based polymer of the foam layer can include the same or different colorants (e.g., black or gray colorants to reduce/prevent light transmission and create higher contrast for graphic prints).

In some embodiments, the resultant multilayered sheet (e.g., laminate and/or composite sheet) and/or board material may be a rigid sheet and/or board material and may exhibit a flexural modulus sufficient to withstand the expected handling and use conditions. The flexural modulus of the multilayered sheet material according to the present disclosure can vary, for example, may be engineered by selecting various properties such as foam thickness and/or foam density, thickness of the multilayered sheet, and/or filler modification of the multilayer sheet, without limitation.

At least a portion of (e.g., substantially the entirety of) one of the outer surfaces 26, 28, or at least a portion (e.g., substantially the entirety of) both outer surfaces 26, 28 of the multilayered sheet material 10 may have a surface texture sufficient for printing applications.

The multilayered sheet (e.g., laminate and/or composite sheet) material 10 and/or 10" can also have any desired thickness to suit the intended application. For example, in some embodiments, the multilayered sheet (e.g., laminate and/or composite sheet) material can have a thickness ranging from about 1 mm to about 12 mm, for example ranging from about 3 mm to about 3.5 mm, for example about 3 mm, without limitation. Thinner or thicker multilayered sheet (e.g., laminate and/or composite sheet) materials are also included within the scope of the presently disclosed subject matter.

The heat treated polypropylene-based foam sheet materials and/or multilayered sheet (e.g., laminate and/or composite sheet) and/or board materials (e.g., foam board, foam core board) materials including the heat treated polypropylene-based foam sheet material as a layer according to the present disclosure may be useful as substrates for printing applications, such as but not limited to substrates for producing printed decorative panels, sign panels, etc. Examples of products (e.g., printed products, printed panels, etc.) may include, without limitation, sign panels; decorative panels (e.g., for home décor, interiors of recreational vehicles (RVs) that can have printed and/or textured surfaces), protective panels for interiors of recreational vehicles (RVs) that can have printed and/or textured surfaces; protective packaging applications including packaging products that can be cut and folded to custom sizes and/or shapes; food service (food container) applications wherein a closed cell foam can provide greater cleanliness and sanitation than materials that allow liquid entry; flotation products for special packaging (for example, military packaging) and/or water-recreation products; and the like.

The present disclosure is not limited to printed applications. Heat treated polypropylene-based foam materials and/or multilayered sheet products including a heat treated polypropylene-based foam layer may also be suitable for other applications, such as but not limited to insulation applications, e.g., boxes constructed for frozen foods, recreational coolers, etc. Multilayered sheet products useful for insulating applications may include, for example, foil laminated products including outer foil layers to provide light and/or heat reflection. Non-limiting examples thereof may include a product including a heat treated polypropylene-based foam layer sandwiched between outer polypropylene polymer film layers and further including a foil layer adhered to the outer surface of the polypropylene polymer film layer(s) so that the foil layer forms the outermost surface of the product. The foil layer may be pre-laminated to the polypropylene film. Another non-limiting example may include a product including a heat treated polypropylene-based foam layer sandwiched between outer foil layers, wherein the foil layers are tie-layer laminated directly to the heat treated polypropylene foam layer.

Figure 2A:
FIGS. 2A and 2B are front elevation views of examples of a printed article (e.g., a decorative panel and a printed sign panel, respectively) including an ink layer printed on an outer surface of a multilayered sheet material and/or board material in accordance with embodiments of the present disclosure.
Figure 2B:
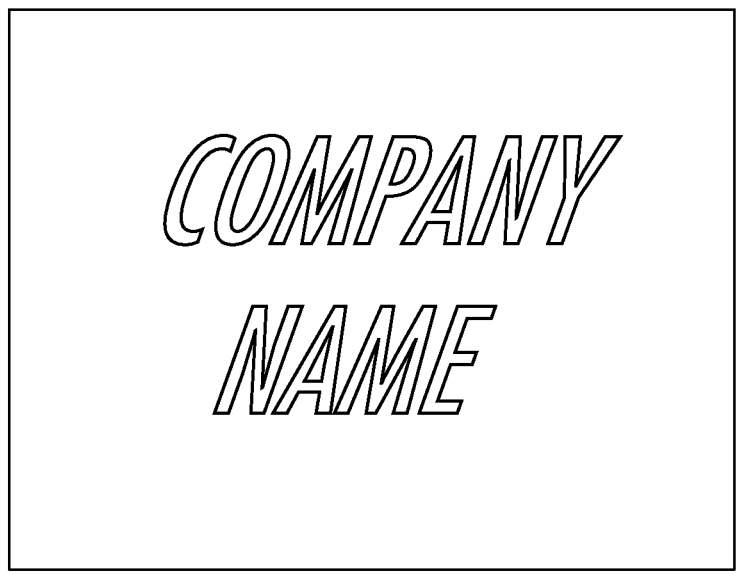

For purposes of illustration only, and without limitation, FIGS. 2A and 2B depict exemplary printed products including a multilayered sheet material and/or board material including a heat treated polypropylene-based foam sheet material as a layer according to the present disclosure. Specifically, FIG. 2A is a side elevation view of a decorative panel 50 and FIG. 2B is a side elevation view of a sign panel 51, each including a design applied (e.g., printed) to outer surface 26 of multilayered sheet and/or board material 10 of FIG. 1. A variety of printed design elements (e.g., printed indicia) can be applied (printed) to an outermost surface, and in some embodiments to both opposing outermost surfaces, of the multilayered sheet materials and/or board materials of the present disclosure. A design element can be applied (e.g., printed) to at least a portion of an outer surface(s) (e.g., substantially the entire surface area of an outer surface) of the multilayered sheet and/or board using techniques known in in the art (e.g., flexographic printing, gravure printing, etc.) and inks also as known in the art (e.g., solvent-based inks, water-based inks, ultraviolet (UV) curable inks, etc.).

The type of printed design is not limited and can include text and/or images (e.g., company names, logos, directions, instructions, art reproductions, etc.). As non-limiting examples, the decorative panel 50 of FIG. 2A includes a reproduction of a photograph printed on at least a portion (e.g., substantially the entirety) of an outermost surface of multilayered sheet and/or board material 10. As another non-limiting example, the sign panel 51 of FIG. 2B includes printed indicia (e.g., text forming a company name). The resultant printed products (e.g., printed decorative panels, sign panels, etc.) can be useful in indoor and/or outdoor environments.

Figure 3:
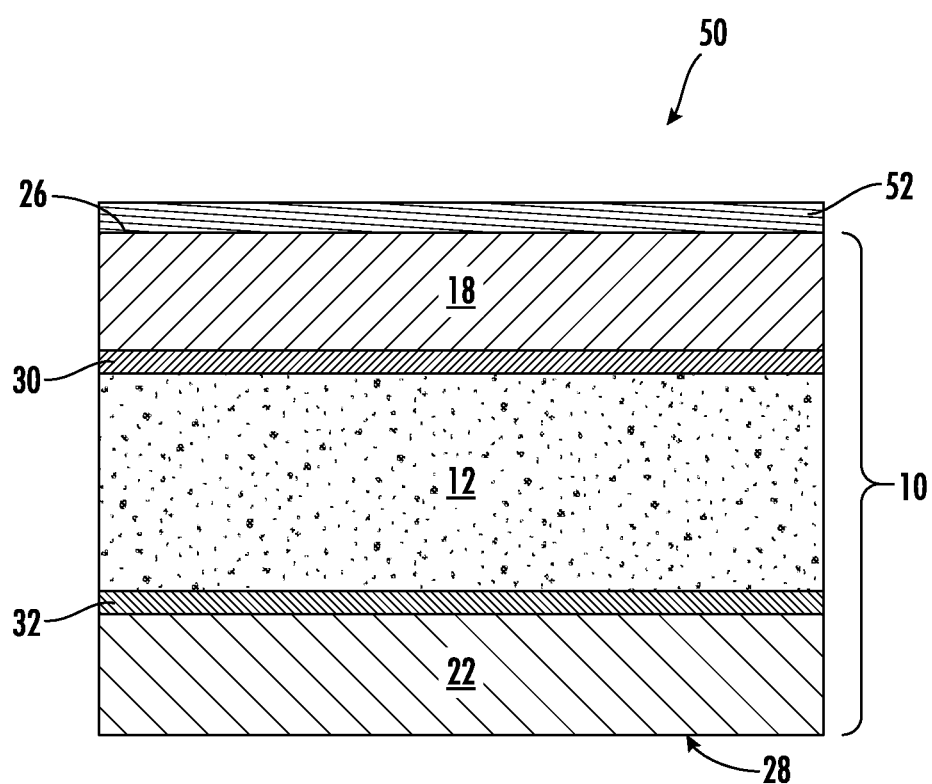
FIG. 3 is a schematic cross-sectional view of the decorative panel of FIG. 2A taken along lines 3-3 of FIG. 2A.

FIG. 3 is a schematic cross-sectional view of the decorative panel 50 of FIG. 2 taken along lines 3-3 of FIG. 2A and depicts the multilayered sheet (e.g., laminate and/or composite sheet) and/or board material 10 having opposing first and second outer surfaces 26 and 28, respectively. The decorative panel 50 also can include an ink layer 52 (e.g., the printed photograph reproduction of FIG. 2A) on at least one outer surface 26, and, in some embodiments, on both outer surfaces 26 and 28 (not shown).

Figure 10:
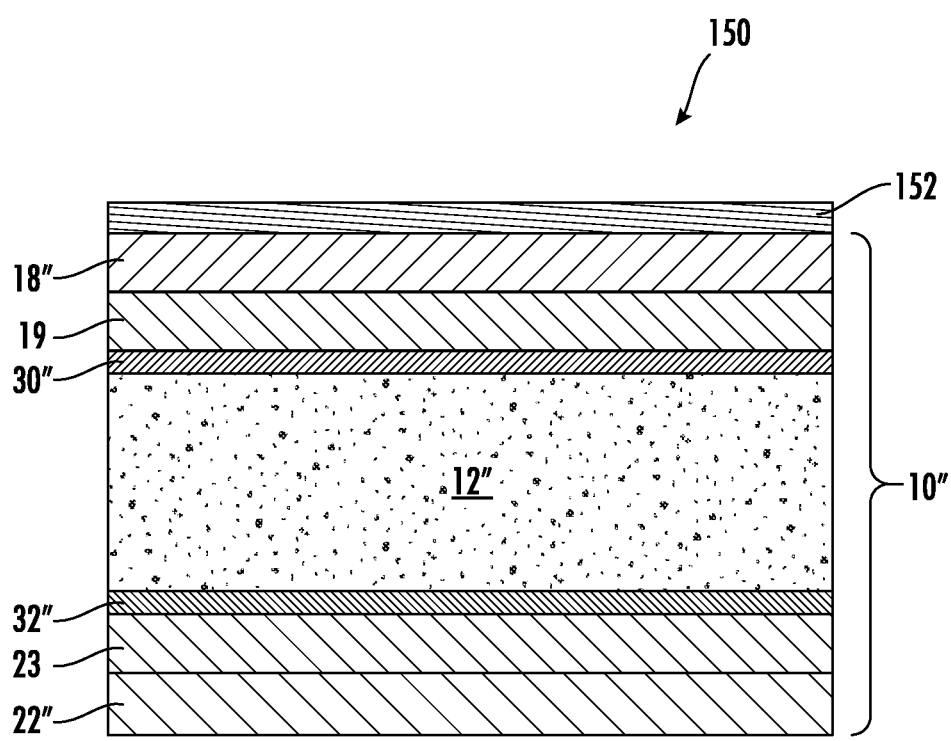
FIG. 10 is a schematic cross-sectional view of a decorative panel including an ink layer printed on an outer surface of a multilayered sheet material and/or board material in accordance with other embodiments of the present disclosure.

FIG. 10 is a schematic cross-sectional view of another exemplary panel 150 having opposing outer surfaces and depicts the multilayered sheet and/or board material 10" of FIG. 9 including an ink layer 152 (e.g., a printed ink layer forming text and/or images) on at least one outer surface. Again, in some embodiments, the panel may include a printed design on both outer surfaces of the multilayered and/or board material 10".

Figure 4:
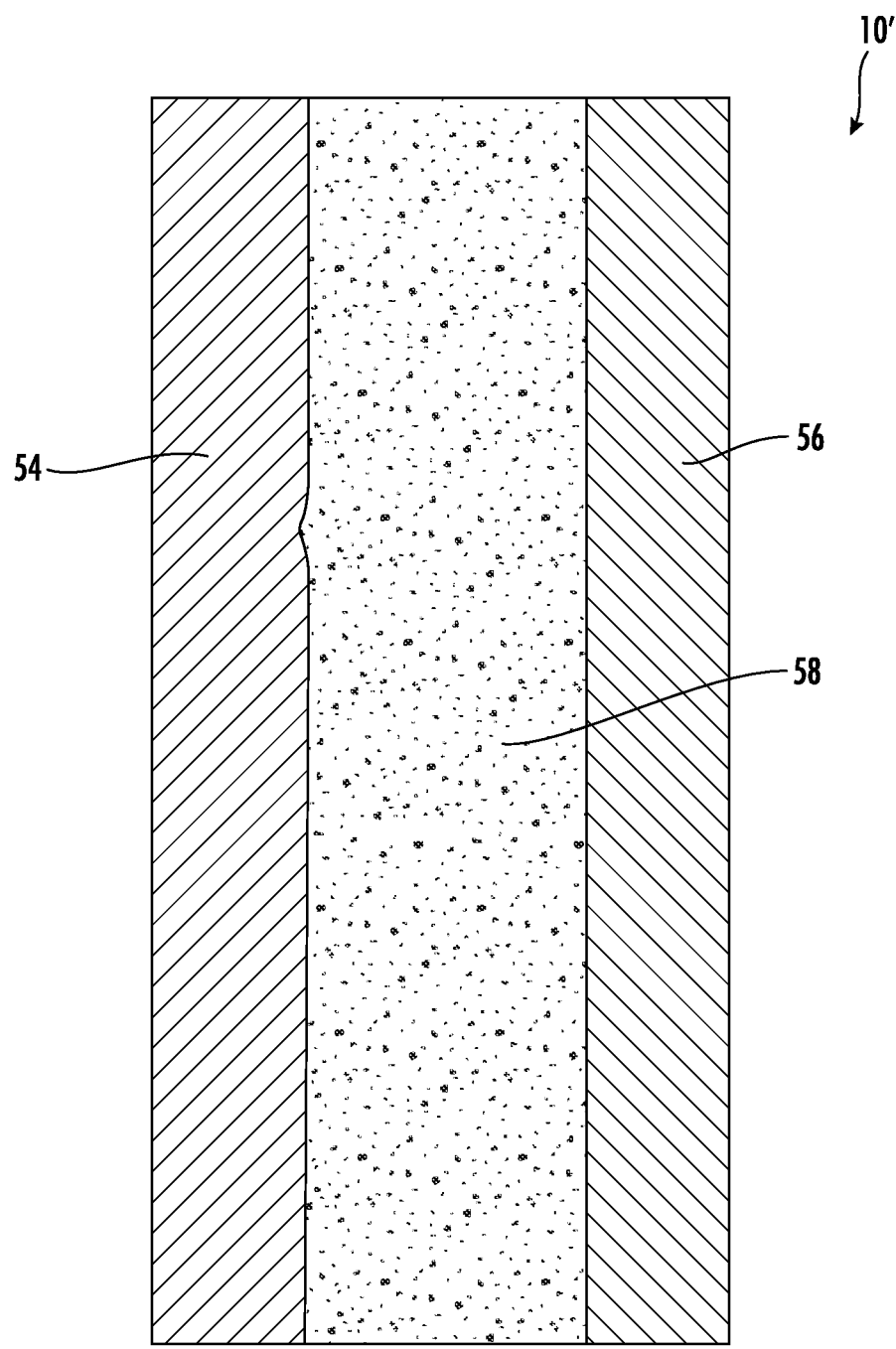
FIG. 4 schematically depicts a micrograph of a cross section of a portion of a representative multilayered sheet material according to embodiments of the present disclosure from which a printed product such as a decorative panel or a sign panel of FIGS. 2A and 2B, respectively, can be manufactured.

FIG. 4 schematically depicts a micrograph of a cross section of a portion of a multilayered sheet (e.g., laminate and/or composite sheet) material that is representative of an exemplary multilayered sheet (e.g., laminate and/or composite sheet) material designated as 10' according to embodiments of the present disclosure from which a printed product such a decorative panel of FIG. 2A can be manufactured. Specifically, the multilayered sheet (e.g., laminate and/or composite sheet) 10' of FIG. 4 includes first and second outer 0.2 mm coextruded layers (coextruded polypropylene film/polypropylene bonding layers) 54, 56 sandwiching a 2.6 mm heat treated polypropylene foam core layer 58.

The present disclosure also relates to methods for the production or manufacture of a heat treated polypropylene-based foam sheet material and/or a multilayered sheet (e.g., laminate and/or composite sheet) including a heat treated polypropylene-based foam layer such as, but not limited to, a multilayered sheet (e.g., laminate and/or composite sheet) 10 of FIG. 1. The heat treated polypropylene-based foam sheet material and/or multilayered sheet (e.g., laminate and/or composite sheet) material including a heat treated polypropylene-based foam layer of the present disclosure may be produced using a dual (double) belt lamination system (also referred to as a flat-bed lamination system), such as a dual belt lamination system 60 schematically illustrated in FIGS. 5A and 5B. As a more specific example, the method can include heat treating a polypropylene-based polymer foam precursor structure (e.g., normalizing and/or annealing as non-limiting examples of heat treating methods) to relax and/or destress the polypropylene-based polymer of the precursor polypropylene-based polymer foam structure and/or to relax and/or destress the precursor foam structure itself using a dual (double) belt lamination system).

Figure 5A:
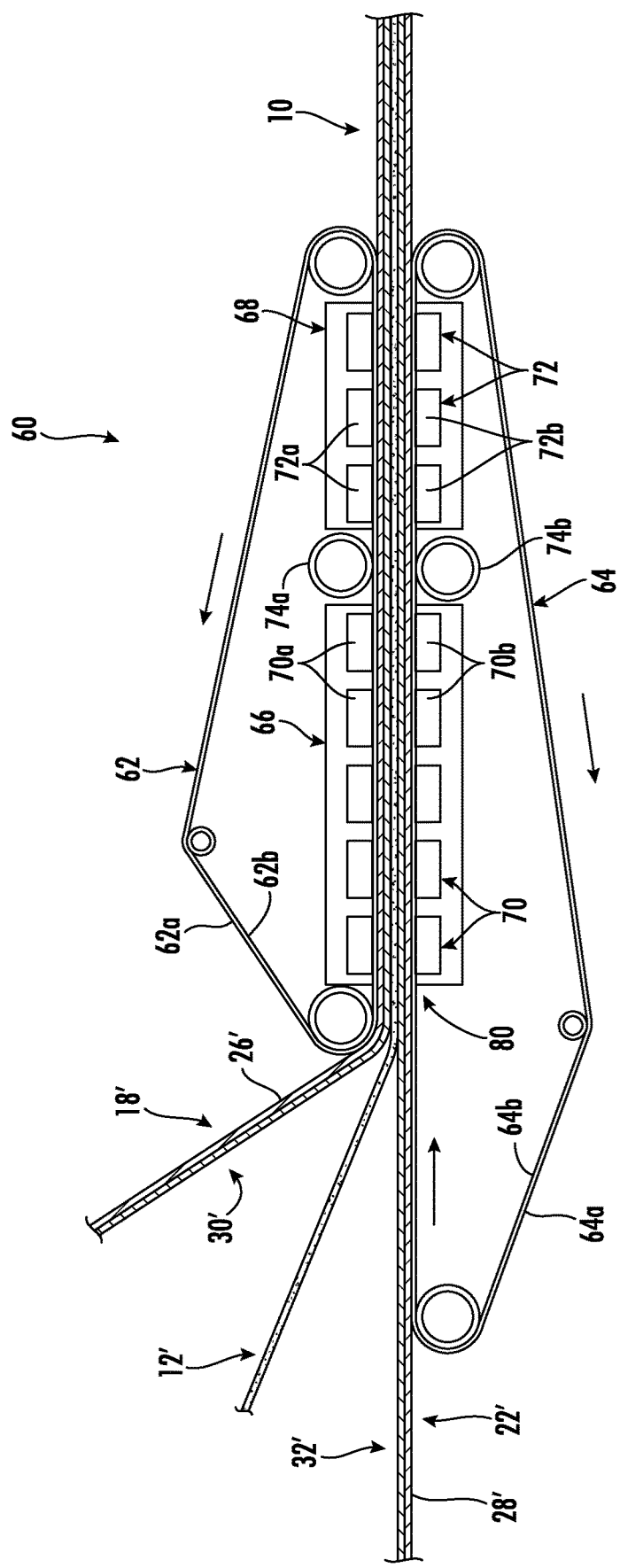
FIG. 5A is a schematic side elevation view of an exemplary system and method for the manufacture of a multilayered sheet material in accordance with embodiments of the present disclosure.
Figure 5B:
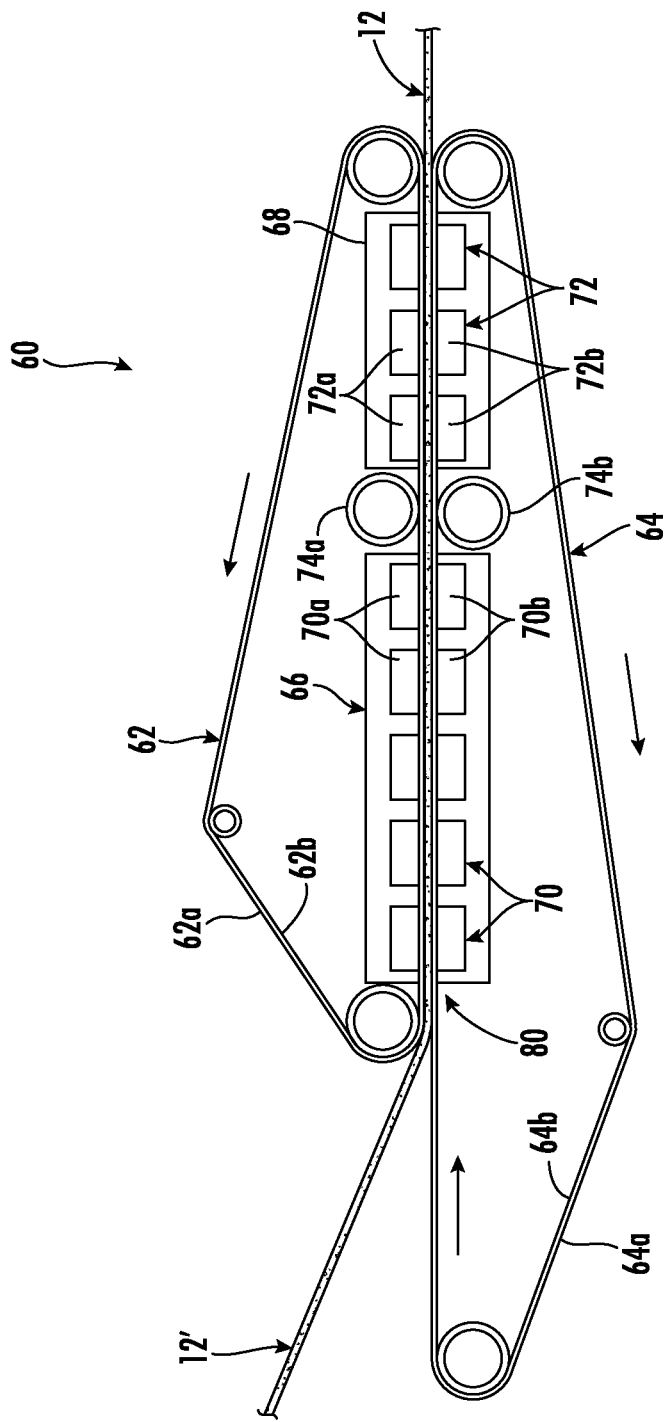
FIG. 5B is a schematic side elevation view of an exemplary system and method for the manufacture of a polypropylene-based foam sheet material in accordance with embodiments of the present disclosure.

As shown in FIGS. 5A and 5B, generally, the belt lamination system 60 includes an upper continuous belt 62 and a lower continuous belt 64 positioned relative to one another so that the belts cooperate to move a substrate positioned therebetween sequentially through a heating zone 66 and a cooling zone 68 of the dual belt lamination system. The upper continuous belt 62 and lower continuous belt 64 may also cooperate to press (apply pressure to) the opposing surfaces of the substrate. For example, upper continuous belt 62 and lower continuous belt 64 may apply downward and upward pressure, respectively, to opposite sides of the substrate, which can help promote heat treatment (e.g., normalizing and/or annealing), lamination, flattening, etc. of the substrate.

The dual belt lamination system 60 may include one or more modular units, as known in the art. The belt lamination system 60 may also include additional heating and/or cooling zones, as well as other additional elements that are not illustrated, such as but not limited to upstream rolls (e.g., film stretching/orienting rolls, guide rolls, etc.), pre-heating units, and the like, as also known in the art. Belt lamination systems are known in the art and are commercially available, and the present disclosure is not limited to the specific system depicted in FIGS. 5A and 5B.

In the method, upper and lower continuous belts 62 and 64 cooperate to direct (advance, move, transport, etc.) a precursor of the heat treated polypropylene-based foam sheet material and/or a precursor of the multilayered sheet material including a heat treated polypropylene-based foam layer according to the present disclosure sequentially through heating zone 66 and cooling zone 68.

In some embodiments, the precursor (e.g., precursor sheet material) can be a precursor polypropylene-based foam sheet material, such as a polypropylene-based foam sheet material 12' depicted in FIG. 5B. In embodiments wherein the precursor material is a polypropylene-based foam sheet, the precursor polypropylene-based foam sheet may be treated in accordance with the method described herein and thereafter be used as is or combined with one or more other layers to provide a multilayered structure, such as described herein. Further, in some embodiments, the multilayered structure including the treated polypropylene-based foam layer may also be treated in accordance with the method described herein.

In some embodiments, the precursor (e.g., precursor sheet material) can be a precursor multilayered sheet material including a precursor polypropylene-based foam sheet material in combination with one or more other layers as discussed herein, such as a precursor polypropylene-based foam sheet material 12', a first coextruded laminate including a polypropylene-based film 18'/polypropylene-based bonding layer 30', and a second coextruded laminate including a polypropylene-based polymer film 22'/polypropylene-based bonding layer 32' depicted in FIG. 5A.

Thus, generally the precursor may include a precursor polypropylene-based foam layer, singly or optionally in combination with one or more additional layers (e.g., one or more polypropylene-based polymeric film and/or bonding layers as described herein).

The following discussion will generally focus on the method and system of FIG. 5A depicting the treatment of a multilayered sheet material but is also generally applicable to the method and system of FIG. 5B (i.e., the method and system described with reference to FIG. 5A can generally be the same for polypropylene-based foam sheet materials such as depicted FIG. 5B).

As noted herein, polypropylene foam typically can have properties that can render the foam unsuitable for printing applications, such as irregular thickness, memory (curl), and/or surface roughness. At least some of these properties are currently believed to be the result of internal stresses within the polymer microstructure induced during manufacture (e.g., extrusion) of the foam. For example, it is currently believed that manufacturing conditions may result in constrained polymer chains, crystalline defects, and other polymer microstructure defects, that in turn can create internal stresses within the polymer microstructure and result in foam thickness irregularities, curl, etc.

To address such issues, the method includes directing the precursor structure positioned between upper and lower continuous belts 62 and 64 sequentially through heating zone 66 and cooling zone 68 under conditions to modify properties of the polypropylene-based polymer of the foam layer (and/or to modify properties the foam layer). In some embodiments, the method may also include the upper and lower continuous belts 62, 64 pressing (applying pressure to) opposing surfaces of the precursor structure, which may also help modify properties of the polypropylene-based polymer of the foam layer (and/or to modify properties the foam layer). The conditions may also modify properties of other polypropylene-based polymers and/or layers in the precursor structure when present, and/or properties of the precursor structure itself.

Without being bound by any explanation or theory, it is currently believed that heating the precursor structure and applying pressure to opposing outer surfaces of the precursor as described herein may relax, de-stress, relieve, and/or reduce internal polymer stresses and/or polymer distortions of the polypropylene-based polymer of the precursor foam and/or of the precursor foam structure (e.g., the present method may provide heat and pressure-initiated polymer chain relaxation and/or rearrangement, crystalline defect correction, secondary crystallization, etc.).

In addition, in some embodiments, conditions (e.g., temperature of the heating zone 66) may also achieve lamination (e.g., may adhere layers of a multilayered precursor material). The present disclosure is not so limited, however, and in other embodiments, layers of the multilayered precursor structure may be combined and optionally bonded (adhered) to one another in one or more separate upstream laminating steps (e.g., using roll lamination), in addition to or as an alternative to belt lamination as described herein.

Turning again to FIG. 5A, in exemplary embodiments, the method may include directing a precursor structure (such as a multilayered precursor structure illustrated therein including a precursor polypropylene-based foam layer 12' positioned between first and second precursor coextruded layers (e.g., the first coextruded laminate including polypropylene-based film 18'/polypropylene-based bonding layer 30' and the second coextruded laminate including polypropylene-based polymer film 22'/polypropylene-based bonding layer 32') into a gap between the upper continuous belt 62 and the lower continuous belt 64 of the belt lamination system 60. Upper continuous belt 62 includes first and second opposing surfaces 62a, 62b. As belts 62, 64 pass through the lamination system, the first surface 62a is adjacent (e.g., contacts) an upper outer surface (e.g., surface 26') of the precursor structure. Similarly, lower continuous belt 64 includes first and second opposing surfaces 64a, 64b, wherein as the belts 62, 64 pass through the lamination system, the first surface 64a is adjacent (e.g., contacts) a lower outer surface (e.g., surface 28') of the precursor structure. For example, in the embodiment depicted in FIG. 5A, the upper and lower continuous belts 62, 64 contact opposing outer surfaces of the multilayered precursor structure (e.g., the upper belt 62 contacts an outer surface 26' of film 18' opposite an inner surface of polymer film 18' adjacent foam layer 12' and the lower belt 64 contacts an outer surface 28' of film 22' opposite an inner surface of the polymer film 22' adjacent the foam layer 12').

In more detail, as depicted in FIG. 5A, in some embodiments, the method may include directing the polypropylene-based foam layer 12', the first coextruded laminate including bonding layer 30' on at least a portion of a surface of first polymer film 18' opposite surface 26' and the second coextruded laminate including a bonding layer 32' on at least a portion of a surface of second polymer film 22' opposite surface 28' from respective rolls or other supply sources (not shown) so that the foam layer 12' is positioned between bonding layers 30' and 32' of polymer film layers 18' and 22' to form a multilayered precursor structure upstream of the entry into the belt laminator system 60.

The coextruded bonding layer/polymer film laminates may be produced in a separate manufacturing step or may be produced upstream of the belt lamination system 60 and directed to the lamination system 60 as a part of an integrated production system.

Although FIG. 5A depicts a multilayered precursor structure, again the present disclosure is not so limited. More generally, the precursor structure can have different numbers of layers. As non-limiting examples, the precursor structure according to the present disclosure may include one or more additional polymeric foam, film, bonding, and/or coextruded layers (e.g., one, two, three, four, or more of any of polymeric foam, film, bonding, and/or coextruded layers). In addition, or as an alternative, in other non-limiting examples, one or more layers such as one or more of the polymeric film, bonding, and/or coextruded layers can be omitted, so long as the precursor structure includes at least one polypropylene-based foam layer. In addition, or as an alternative, in some non-limiting examples, the precursor structure may include one or more monolayer lamination films (e.g., one or more polypropylene-based monolayer films without a bonding layer) on one or both opposing surfaces of a foam layer(s); one or more polypropylene-based polymer layer(s) extrusion coated onto one or both opposing surfaces of a foam layer(s); and/or wet (paint-like) coating(s) on one or both opposing surfaces of a foam layer(s) and/or other outermost layers of the multilayered precursor material.

In some embodiments, the precursor structure may include (e.g., may consist of) one or more polypropylene-based foam layers(s), such as precursor foam layer 12' depicted in FIG. 5B. As noted herein, in such embodiments, the precursor polypropylene-based foam layers(s) may be treated using the bed lamination system under conditions described herein with reference to FIG. 5A. In some embodiments, after treatment in accordance with the method disclosed herein, the polypropylene-based foam may be used as is. In some other embodiments, the polypropylene-based foam sheet material may thereafter be combined (laminated) using dual belt lamination and/or other lamination systems with one or more additional layers (e.g., one or more polypropylene-based polymeric films, polypropylene-based bonding layers, coextruded bonding layer/film laminates, etc.) to provide a multilayered sheet (e.g., laminate and/or composite sheet) material such as described herein.

Again referring to FIG. 5A (and FIG. 5B), moving in a direction indicated by the arrows in FIG. 5A (and FIG. 5B), the continuous upper and lower belts 62, 64 direct (e.g., advance, transport, move, convey, etc.) the multilayered precursor structure (or, as shown in FIG. 5B, the precursor foam sheet) through heating zone 66. Heating zone 66 may include any suitable heating mechanism. For example, as known in the art, an exemplary heating zone may include a plurality of upper temperature-controlled heating elements (not shown) located above upper continuous belt 62 (e.g., proximate surface 62b of belt 62) and a plurality of lower temperature-controlled heating elements (not shown) located below lower continuous belt 64 (e.g., proximate surface 64b of belt 64), wherein the plurality of upper and lower heating elements are positioned so that the upper and/or lower belts 62, 64 transport the multilayered structure between the plurality of upper and lower heating elements.

As continuous belts 62 and 64 move the precursor structure through heating zone 66, the heating zone may heat the precursor structure at a temperature sufficient to effect changes in the polypropylene polymer of the precursor foam layer and/or to effect changes in the precursor foam (e.g., to effect changes in the foam structure itself), and optionally of polypropylene-based polymers of one or more other layers and/or of the structure of the one or more other layers when present. Suitable heating temperatures may generally include a temperature that is at or above a temperature sufficient to relax and/or destress the polypropylene-based polymer of the precursor foam layer and/or to relax and/or destress the precursor foam layer (e.g., at or above an annealing and/or normalizing temperature of the polypropylene-based polymer of the foam layer 12' and/or of the polypropylene-based polymer foam layer 12'), but is less than the melting point (melting temperature $T_m$) of the polypropylene-based polymer of foam layer 12'. Optionally suitable heating temperatures may also generally include a temperature that is at or above a temperature sufficient to relax and/or destress the polypropylene-based polymer(s) of one or more other layers and/or to relax and/or destress the structure of the one or more other layers when present, such as polymer films 18' and/or 22' (e.g., at or above an annealing and/or normalizing temperature of the polypropylene-based polymer of the one or more other layers when present and/or of the one or more layers when present) and optionally less than the $T_m$ of polypropylene-based polymers of the one or more other layers when present. Accordingly, in some embodiments, the heating zone may heat the precursor structure to a temperature at or above a temperature sufficient to relax and/or destress the polypropylene-based polymer of the precursor foam layer 12' and/or to relax and/or destress the structure of the precursor foam layer 12' (and optionally at or above a temperature sufficient to relax and/or destress the polypropylene-based polymer of one or more other layers and/or to relax and/or destress the structure of the one or more layers when present such as polymer films 18' and/or 22') but less than the melting point (melting temperature $T_m$) of the polypropylene-based polymer of foam layer 12' (and optionally less than the $T_m$ of polypropylene-based polymers of other layers when present, such as polymer films 18' and/or 22') to promote heat treatment (e.g., normalizing and/or annealing) of the foam layer (and optionally to promote heat treatment, e.g., normalizing and/or annealing of other layers when present, such as polymer films 18' and/or 22').

The temperature at which the precursor structure is heated within the heating zone/step may vary, depending, for example, on the specific polypropylene polymer of the foam layer (and optionally the polypropylene polymer of other layers such as polymer films when present) and/or depending on the thickness and density of the foam. Generally, the method may include heating the precursor structure as the structure moves through the heating zone 66 at a temperature that ranges from about 5° F. to about 50° F., for example from about 10° F. to about 40° F., below the melting temperature of the polypropylene-based polymer of foam layer 12'. In some embodiments, the heating zone may heat the multilayered precursor structure at a temperature from about 270° F. to about 300° F. (about 130° C. to about 150° C.), for example, about 280° F. (about 138° C.), as the structure moves through the heating zone 66.

Again, without being bound by any explanation or theory, it is currently believed that heating the precursor structure and applying pressure to opposing outer surfaces of the precursor structure as described herein may relax, relieve, and/or reduce internal polymer stresses and/or polymer distortions of the polypropylene-based foam (e.g., the present method may provide heat and pressure-initiated polymer chain relaxation and/or rearrangement, crystalline defect correction, secondary crystallization, etc.).

In some embodiments in which the precursor structure includes bonding layers that have not been subjected to conditions sufficient to bond the foam layer to the polymer films prior to entering the belt lamination system 60, the temperature of the heating zone 66 may also heat the structure to a temperature sufficient to activate the adhesive properties of the bonding layer material of bonding layers 30' and 32' to facilitate bonding (adhesion) of the foam layer 12' and the polymer films 18' and 22' to form an integrated (unitary) laminate structure.

Heating zone 66 of FIG. 5A and FIG. 5B may further includes a plurality of pairs of pressure plates (e.g., pressure bars) positioned in series generally along the length (in the machine direction) of the heating zone. For ease of reference, in FIG. 5A (and FIG. 5B), representative pairs of plates are designated with the numeral 70. Each pair of plates 70 includes an upper plate 70a and an opposing lower plate 70b defining a gap therebetween. One or more (e.g., each) of the upper plates 70a is positioned adjacent (e.g., in a face-to-face relationship to, contacting) and/or slidingly engages the second surface 62b of continuous upper belt 62 and one or more (e.g., each) of the opposing lower plate 70b is positioned adjacent (e.g., in a face-to-face relationship to, contacting) and/or slidingly engages the second surface 64b of continuous lower belt 64.

Upper and lower plates 70a, 70b generally extend across (e.g., span) the width of continuous upper and lower belts 62, 64, respectively (e.g., each generally extends in a cross-machine direction). The distance between an upper plate 70a and a coordinating lower plate 70b of a pair of plates 70 can be set to provide (define) a predetermined sized gap through which the precursor material travels. In addition, upper and lower plates 70a, 70b of a pair of plates 70 can move together in a vertical direction, relative to an averaged centerline of the precursor material path 80 through the laminator system 60 (e.g., an averaged horizontal path of the precursor material as advanced by upper and lower continuous belts 62, 64 through heating zone 66 such as depicted in FIGS. 5A and 5B). Thus, each pair of plates 70 can be independently adjusted upwardly and/or downwardly to a position above and/or below the averaged centerline of the precursor material path.

Figure 5C:
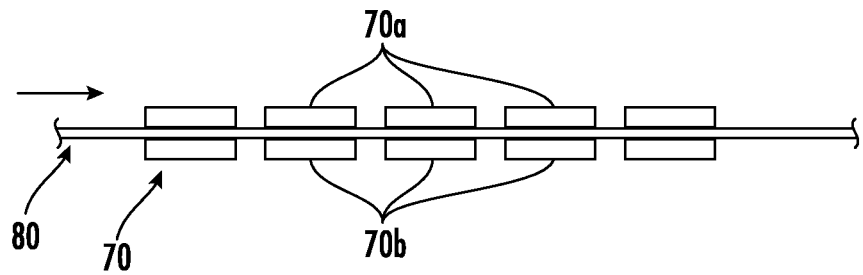
FIGS. 5C and 5D are each an isolated side elevation view of a portion of a series of pairs of plates along a material path through a heating zone of FIG. 5A and FIG. 5B.
Figure 5D:
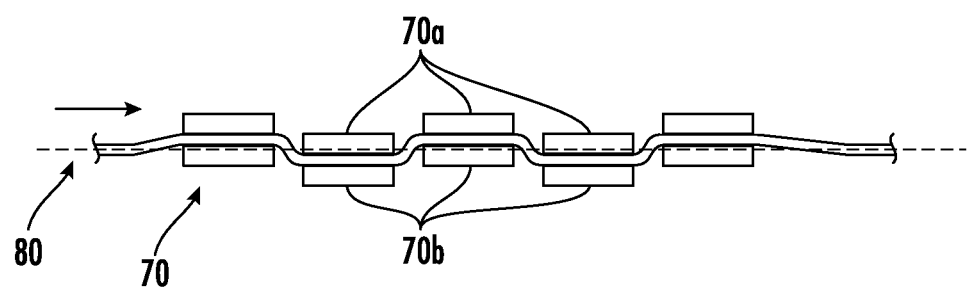

Reference is made to FIGS. 5C and 5D, which schematically depict isolated side elevation views of a portion of a series of pairs 70 of plates, each pair including opposing upper and lower plates 70a, 70b, respectively.

FIG. 5C depicts an exemplary embodiment of the present disclosure. FIG. 5C depicts pairs 70 of plates wherein the vertical positions of one or more (e.g., all) pairs are adjusted so that the gaps between the upper and lower plates 70a and 70b of pairs 70 of plates are generally along (e.g., generally in alignment with, no substantial vertical off-set upwardly and/or downwardly relative to) the averaged centerline of the precursor material path 80 (e.g., the path through heating zone 66). In this embodiment, the precursor material may be subjected to substantially minimal or no upwardly and/or downwardly movement relative to the average centerline of the material path as the material passes through gaps between upper and lower plates 70a, 70b of pairs 70 of plates.

FIG. 5D depicts pairs of plates 70 positioned in accordance with another embodiment of the present disclosure. In contrast to FIG. 5C, as depicted in FIG. 5D, the vertical positions of alternating pairs 70 of the plates can be adjusted upwardly and/or downwardly so that the serial arrangement of gaps between the upper and lower plates 70a and 70b of alternating pairs of plates 70 can alternate between positions above and/or positions below the averaged centerline of the precursor material path 80. The precursor material may accordingly be subjected to alternating (and typically gentle) upwardly and/or downwardly movement (e.g., undulating movement) relative to the averaged centerline of the precursor material path (e.g., the averaged centerline of the precursor material path through the heating zone 66 of FIG. 5A and/or FIG. 5B) as the precursor material moves through gaps between upper and lower plates 70a, 70b of pairs 70 of plates alternating between positions above and/or below the average centerline of the material path. Thus, the material path 80 can be referred to as an undulating path, even though the upper and lower plates 70a, 70b typically remain stationary during manufacturing. Regarding the respective example depicted in the drawings, it is believed the undulating material path 80 can be at least partially defined by one or more guides and/or one or more guideways at least partially defined by one or more suitably configured structure(s) such as, but not limited to, for example, the upper and lower plates 70a, 70b.

Upper plates 70a may apply pressure to surface 62b of continuous upper belt 62 and to outer surface 26' of the precursor material and lower plates 70b may apply pressure to surface 64b of continuous lower belt 64 and to outer surface 28' of the precursor structure. It is currently believed that in some embodiments, the alternating upward and downward movement of the precursor material can provide repeated and variable pressure (e.g., on-and-off pressure) against the material and/or against alternating surfaces of the material.

As a non-limiting example, FIG. 5D schematically illustrates an embodiment of the present disclosure wherein the vertical positions of the first, third and fifth pairs of plates 70 in series are adjusted upwardly so that the gaps between the upper and lower plates 70a and 70b of the first, third and fifth pairs are at a position above the averaged centerline of the precursor material path 80. As also illustrated in FIG. 5D, the vertical positions of the second and fourth pairs of plates 70 in series are adjusted downwardly so that the gaps between the upper and lower plates 70a and 70b of the second and fourth pairs are at a position below the averaged centerline of the precursor material path 80. Generally, as schematically depicted in FIG. 5D, the precursor material may be subjected to alternating upwardly and downwardly movement relative to the averaged centerline of the precursor material path as the material moves upwardly and downwardly through the gaps between the plates.

The present disclosure is not limited to embodiments illustrated in FIG. 5C and FIG. 5D. For example, the belt laminator system may include more or fewer pairs 70 of plates. Also, the vertical positions of two or more adjacent pairs of plates (e.g., two, three, or more adjacent pairs of plates) can be adjusted upwardly and/or downwardly so that the serial arrangement of the two or more adjacent pairs of plates can alternate between positions above and/or positions below the averaged centerline of the precursor material path. Still further, in some embodiments, the vertical positions of a single pair of plates and/or the vertical positions of multiple adjacent pairs of plates can alternate between positions above and/or positions below the averaged centerline of the precursor material path. Still further, some embodiments may include both: one or more pairs of plates in which gaps between upper and lower plates thereof are generally aligned with the average centerline of the precursor material path; and a series of pairs of plates in which the vertical positions of alternating pairs of plates are adjusted upwardly and/or downwardly so that a serial arrangement of gaps between the upper and lower plates of the alternating pairs of plates can alternate between positions above and/or positions below the averaged centerline of the precursor material path.

Without being bound by any explanation or theory, it is currently believed that heating the precursor structure and/or applying pressure to opposing outer surfaces of the precursor structure as described herein (e.g., concurrently heating the precursor structure and applying pressure to outer surface(s) of the precursor structure by pressure applied to outer surfaces of the precursor structure by upper and lower belts 62, 64 and/or as the precursor structure passes through a serial arrangement of gaps between upper and lower plates 70a and 70b of pairs of plates 70, the gaps in substantial alignment with the averaged centerline of the precursor material path, and/or as the precursor structure is subjected to alternating upwardly and downwardly movement relative to the averaged centerline of the material path as the material passes through a serial arrangement of gaps between upper and lower plates 70a and 70b of alternating pairs of plates 70, the gaps alternating between positions above and/or positions below the averaged centerline of the precursor material path) may relax, relieve, and/or reduce internal polymer stresses and/or polymer distortions of the polypropylene-based foam (e.g., the present method may provide heat and pressure-initiated polymer chain relaxation and/or rearrangement, crystalline defect correction, secondary crystallization, etc.). Also without being bound by any explanation or theory, it is currently believed that the foregoing described heating and/or pressure applying steps may improve flatness of the foam layer and/or improve thickness uniformity across the width of the foam layer and/or reduce or eliminate memory of the foam layer to provide a substantially planer (flat) foam sheet material with minimal or no curl.

In addition, the present inventors have also unexpectedly and surprisingly found that the heating steps described herein achieved using dual belt lamination can also further expand the foam, for example, can achieve about 10% to about 35%, for example about 10% to about 15%, and as another example about 25% to about 35%, post-expansion of the foam. Thus, the method of the present disclosure may increase the thickness of the precursor foam sheet by about 10% to about 35%, for example about 10% to about 15%, and as another example about 25% to about 35%. This in turn may further reduce the density of the foam.

The method of the present disclosure resulting in this surprising and unexpected post-expansion of the foam layer (for example about 10% to about 35%, for example about 10% to about 15%, and as another example about 25% to about 35%, post-expansion) is also currently believed to contribute to improved flatness and/or thickness uniformity across the width of the heat treated foam layer, etc. For example, generally, it is currently believed that the method of the present disclosure can reduce foam thickness variability by compressing thicker regions of the foam layer and enhancing expansion of thinner regions of the foam layer.

Figure 6:
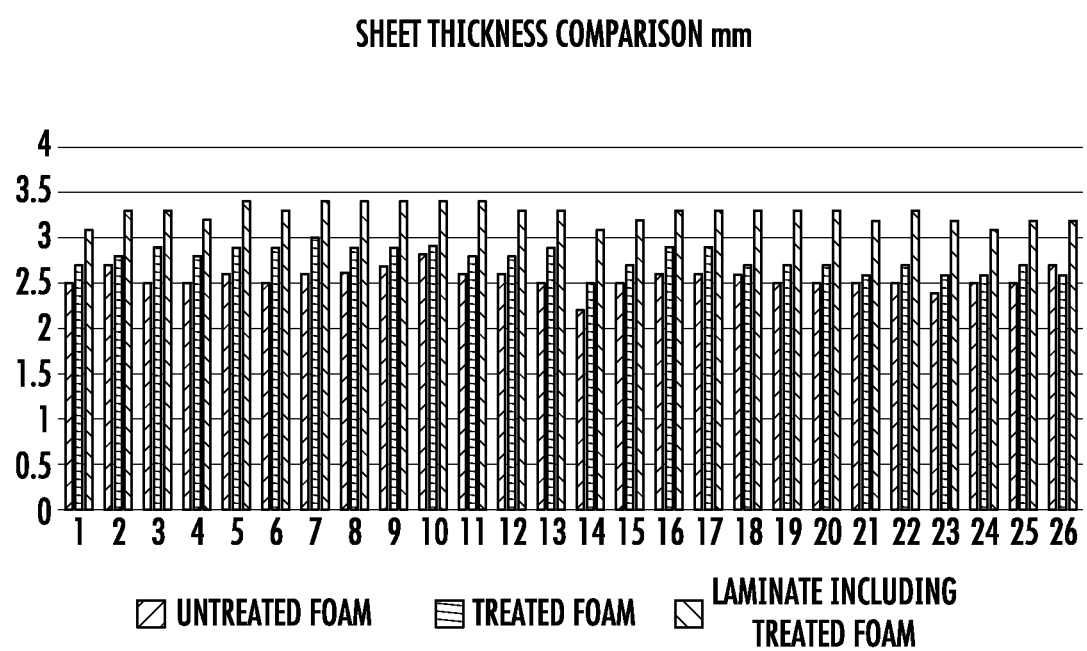
FIG. 6 is a bar graph illustrating a phenomenon of post-expansion of a polypropylene foam layer treated (e.g., heat treated as described herein) in accordance with embodiments of the present disclosure.

FIG. 6 is a bar graph illustrating the phenomenon of post-expansion of a foam layer such as foam layer 18'. In FIG. 6, the graph includes different (twenty-six total) groupings of three bars, and the key or legend of FIG. 6 identifies the bars of each grouping that respectively represent different: initial untreated (precursor) polypropylene-based foam sheets (left bar of each grouping); polypropylene-based foam sheets treated (heat treated) in accordance with the present method disclosed herein (middle bar of each grouping); and multilayered sheets including the polypropylene-based foam sheet treated (heat treated) in accordance with the present method in combination with outer polymer film/bonding layers as described herein (right bar of each grouping). The vertical left axis includes the scale (in millimeters, mm) of the thickness of each of the initial (untreated) polypropylene-based foam layer, the heat treated polypropylene-based foam layer, and the multilayered sheet including the heat treated polypropylene-based foam layer. The difference between the left and middle and bars of each group show the expansion of the polypropylene-based foam upon heat treatment in accordance with the present method as disclosed herein. The increased thickness shown by the right bars of each group generally show additional thickness attributed to the thickness of the additional layers (e.g., polymer film/bonding layers) in combination with the heat treated polypropylene-based foam layer.

Turning again to FIG. 5A (and FIG. 5B), the heated precursor structure exits heating zone 66 and optionally may be directed (conveyed) by upper and lower belts 62 and 64 through a gap between cooperating pressure nip rolls 74a, 74b. At least one (e.g., upper nip roll 74a), and in some embodiments, both nips rolls 74a and 74b may apply compressive forces (pressure) to the multilayered precursor structure. For example, upper nip roll 74a may be adjusted to provide downward pressure to the precursor structure passing between rolls 74a and 74b to promote, for example, heat treatment, lamination, flattening, etc. In addition, the size of the nip-gap between rolls 74a and 74b may be adjusted to further control the amount of compression on the precursor material layer(s). The nip-gap size is not limited and may generally be selected (adjusted) so that the nip-gap size is less than the thickness of the precursor material. In some embodiments, the belt lamination system may include one or more additional pairs of cooperating pressure nip rolls.

As shown in FIG. 5A (and FIG. 5B), the heated precursor structure is then directed through a cooling zone 68 located downstream of the heating zone 66 (and downstream cooperating pressure nip rolls 74a, 74b, when present). As known in the art, cooling zone 68 may include a plurality of controlled temperature upper cooling elements (not shown, e.g., fans and/or other air movers) located above upper continuous belt 62 and a plurality of temperature controlled lower cooling elements (not shown, e.g., fans and/or other air movers) located below lower continuous belt 64, wherein the plurality of upper and lower cooling elements are positioned so that the upper and/or lower belts 62, 64, convey the precursor structure between the plurality of upper and lower cooling elements.

The cooling zone may cool the heated precursor structure to room temperature (typically about 68° F. or about 20° C.) or higher (e.g., in some embodiments about 30° C. to about 60° C.) to set properties (e.g., relaxed and/or destressed polymer and/or foam structures, foam flatness, foam thickness, foam thickness uniformity, foam density, etc.) of the polypropylene-based polymer of the foam layer and/or of the foam layer (processed singly or in combination with other layers).

Similar to heating zone 66, cooling zone 68 may further includes a plurality of pairs 72 of pressure plates (e.g., pressure bars), the pairs positioned in series along the length (in the machine direction) of the cooling zone. Each pair of plates 72 includes an upper plate 72a and a cooperating lower plate 72b defining a gap therebetween. One or more (e.g., each) of upper plate 72a is positioned adjacent (e.g., in a face-to-face relationship, contacting) and/or slidingly engages the second surface 62b of continuous upper belt 62 and one or more (e.g., each) cooperating lower plate 72b is positioned adjacent (e.g., in a face-to-face relationship, contacting) and/or slidingly engages the second surface 64b of continuous lower belt 64.

Upper and lower plates 72a, 72b may also generally extend across (e.g., span) the width of continuous upper and lower belts 62, 64, respectively (e.g., each generally extends in a cross-machine direction). The distance between an upper plate 72a and a coordinating lower plate 72b of a pair of plates 72 may be set to provide (define) a predetermined sized gap through which the heated precursor material travels. Also, similar to pairs of plates 70 described herein, upper and lower plates 72a, 72b of a pair of plates 72 can move together in a vertical direction, relative to an averaged centerline of the heated precursor material path 80 through the laminator system 60 (e.g., an averaged horizontal path of the heated precursor material as advanced by upper and lower continuous belts 62, 64 through cooling zone 68 such as depicted in FIGS. 5A and 5B). Thus, each pair of plates 72 can be independently adjusted upwardly and/or downwardly to a position above and/or below the averaged centerline of the precursor material path.

Also similar to the discussion herein of the pairs of plates 70 located within the heating zone 66, in some embodiments of the present disclosure, the vertical positions of one or more (e.g., all) pairs 72 of plates of the cooling zone 68 may be adjusted so that the gaps between the upper and lower plates 72a and 72b of the pairs of plates 72 are generally along (e.g., generally in alignment with, no substantial vertical off-set upwardly and/or downwardly relative to) the averaged centerline of the heated precursor material path 80 (e.g., the path through cooling zone 66), such as depicted in FIG. 5C and described generally with respect to pairs 70. Also similar to the discussion herein of the pairs of plates 70 located within the heating zone 66, in other embodiments of the present disclosure, the vertical positions of alternating pairs of plates 72 of the cooling zone 68 can be adjusted upwardly and/or downwardly so that the serial arrangement of gaps between upper and lower plates 72a, 72b of a pair 72 of plates can alternate between positions above and/or positions below the averaged centerline of the material path 80, such as depicted in FIG. 5D and described generally with respect to pairs 70.

Generally, belts 62 and 64 move the multilayered structure through the cooling zone at a rate that may be selected based on variables such as the temperature to which the structure is to be cooled, the length of the cooling zone, etc. In some embodiments, the multilayered structure may be transported (moved) through the cooling zone 68 at a rate of speed from about 10 feet/minute to about 30 feet/minute, although the present method is not so limited and the rate of movement of the structure through the cooling zone 68 may vary outside of this range.

The resultant heat treated structure (e.g., a heat treated polypropylene-based foam sheet 12 such as depicted in FIG. 5B and/or a heat treated multilayered sheet 10 such as depicted in FIG. 5A) exits belts 62, 64 and may be directed to additional in-line (integrated) and/or off-line (separate) downstream processing steps. For example, a heat treated polypropylene-based foam sheet and/or multilayered sheet (e.g., laminate and/or composite sheet) including a heat treated polypropylene-based foam layer in accordance with the present disclosure may be trimmed, cut to a specified size, and/or stacked using processes and systems known in the art. Other optional downstream processing steps may include printing one or both sides of a heat treated polypropylene-based foam sheet and/or multilayered sheet and/or boards including a heat treated polypropylene-based foam layer using processes and systems such as flexographic presses, rotogravure presses, inkjet printers, and/or any other suitable devices for applying ink layer(s) to an outermost surface of a heat treated polypropylene-based foam sheet and/or multilayered sheet including the heat treated polypropylene-based foam layer; and/or applying a removable protective film to one or both sides a heat treated polypropylene-based foam sheet and/or multilayered sheet and/or board including a heat treated polypropylene-based foam layer. The present disclosure is not limited to these downstream processing steps and systems.

As noted herein, the method of the present disclosure may provide a foam layer having reduced density and/or improved thickness uniformity across the width of the foam layer, as well as reduced memory of the foam layer to provide a substantially planer (flat) foam sheet material with minimal or no curl.

Figure 7:
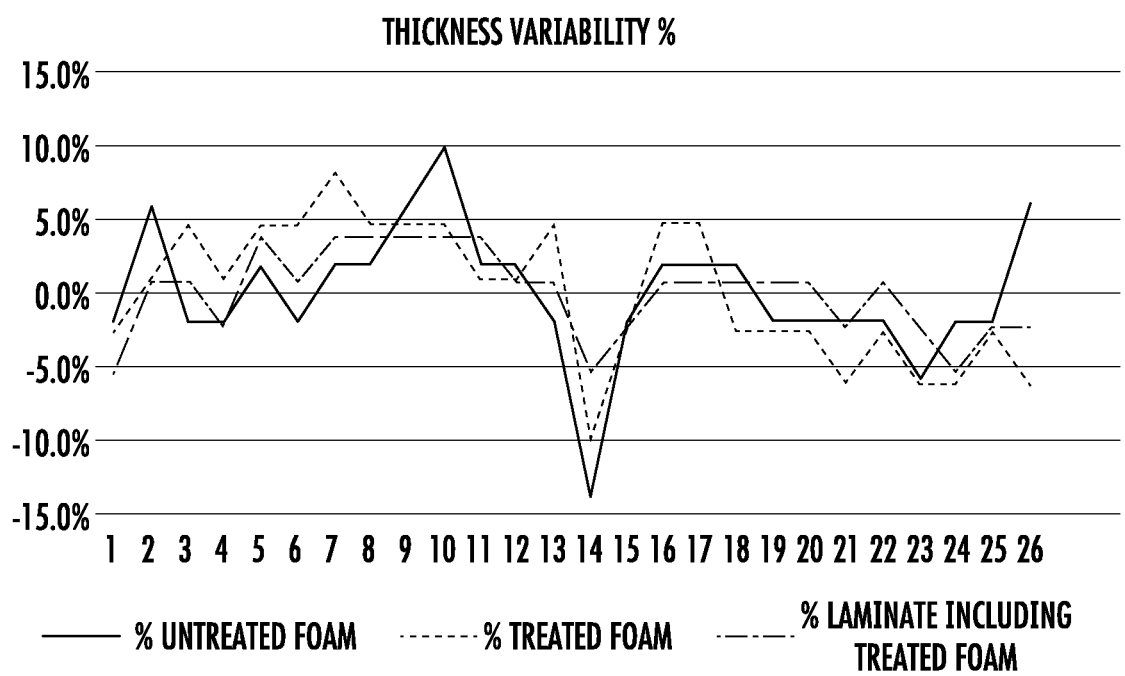
FIG. 7 is a graph illustrating reduction in polypropylene foam thickness variability across the width of a polypropylene foam web treated (e.g., heat treated as described herein) in accordance with embodiments of the present disclosure.

FIG. 7 is a graph illustrating reduction in foam thickness variability across the width of a polypropylene foam web treated in accordance with embodiments of the present disclosure. In FIG. 7, the key or legend identifies the lines that respectively represent different samples (twenty-six total different samples) of: untreated (precursor) polypropylene-based foam webs; polypropylene-based foam webs treated (heat treated) in accordance with the method disclosed herein; and multilayered sheets (laminates) including a polypropylene-based foam web treated (heat treated) in accordance with the method disclosed herein and in combination with outer polypropylene-based polymer film/bonding layer coextruded layers. The left vertical axis includes the scale for thickness variability as a percentage (%) across the width of each of the different samples. In some embodiments, the precursor polypropylene-based foam web has a first percent variation in thickness across a width of the precursor polypropylene-based foam web; and the heat treated polypropylene-based foam web treated in accordance with the method disclosed herein can have a second, lower percent variation in thickness across the width of the heat treated polypropylene-based foam web, as compared to the first percent variation in thickness of the precursor polypropylene-based foam web.

Figure 8:
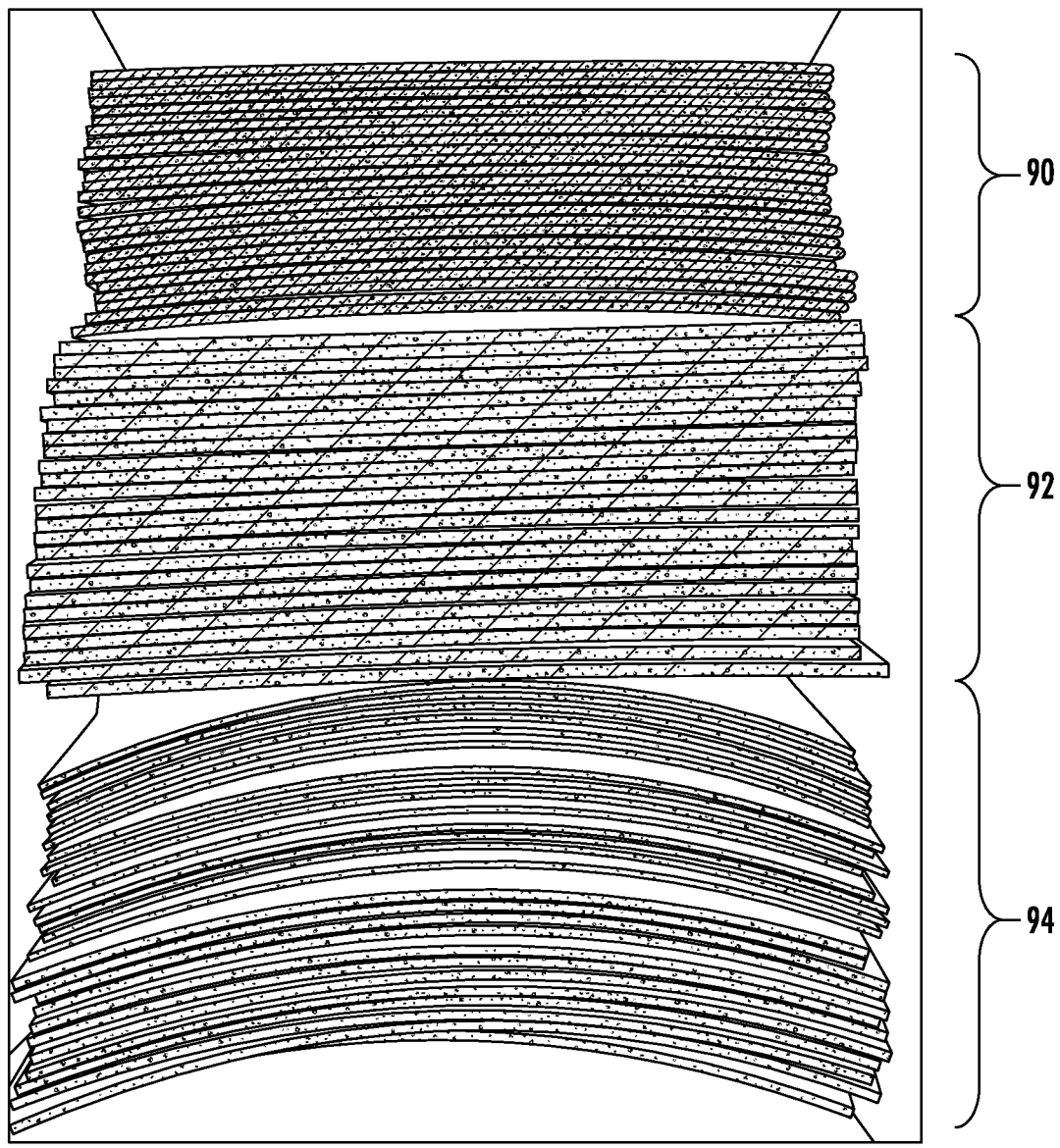
FIG. 8 schematically depicts photographs of end views of from top to bottom: polypropylene foam sheets after treatment (e.g., heat treated as described herein) in accordance with embodiments of the present disclosure; multilayered sheet materials including a polypropylene foam sheet after treatment (e.g., heat treated as described herein) sandwiched between outer polypropylene polymer film/bonding layer coextruded laminate in accordance with embodiments of the present disclosure; and polypropylene foam sheets before treatment (e.g., before heat treatment as described herein) in accordance with embodiments of the present disclosure.

FIG. 8 further schematically depicts changes in polypropylene-based foam properties and/or appearance and includes depictions of photographs of end views of: a group designated at 94 including a plurality of polypropylene-based foam sheets before treatment in accordance with embodiments of the present disclosure (before heat treated); a group designated at 90 including the same polypropylene-based foam sheets of group 94, except after treatment (heat treated) in accordance with embodiments of the present disclosure; and a group designated at 92 including a plurality of multilayered sheet materials, each including a different polypropylene-based foam sheet of group 90 after treatment (heat treated) in combination with outer polypropylene-based polymer film/bonding layer coextruded layers in accordance with embodiments of the present disclosure. As a non-limiting example, over an 8 inch span of each of the samples depicted in FIG. 8, maximum out-of-plane bowing was measured and the results were as follows: for the polypropylene-based foam sheets (before heat treated) of group 94: 3.0"; for the polypropylene-based foam sheets (after heat treated) of group 90: 0.5"; and for the multilayered sheet materials including a polypropylene-based foam sheet of group 90 after treatment (heat treated) in combination with outer polypropylene-based polymer film/bonding layer coextruded layers: 0" (samples are flat).

The method of the present disclosure can provide other benefits, such as but not limited to combining (laminating) multiple layers of a precursor structure when more than one layer is present; compressing layer(s) of a precursor structure (e.g., compressing a precursor polypropylene-based foam sheet and/or compressing a precursor multilayered sheet including a polypropylene-based foam layer); smoothing the surface of a precursor structure (e.g., providing a polypropylene-based foam sheet and/or a multilayered sheet including a polypropylene-based foam layer with an average surface roughness that is less than the average surface roughness of its precursor structure); flattening (reducing curl memory) of a precursor structure (e.g., flattening or reducing curl memory of a precursor polypropylene-based foam sheet layer and/or of a precursor multilayered sheet material including a polypropylene-based foam layer); and/or providing a flat (planar) product according to the present disclosure (e.g. proving a flat polypropylene-based foam sheet and/or multilayered sheet material including a polypropylene-based foam layer).

Other variations of the disclosed embodiments can be understood and effected by those of ordinary skill in the art in practicing the present invention by studying the drawings, the disclosure, and the appended claims. In the claims, the word "comprising" does not exclude other elements or steps, and the indefinite article "a" or "an" does not exclude a plurality. Unless otherwise specified, numerical ranges are intended to include the endpoints.

Numerical values provided throughout this disclosure can be approximate, and for each range specified in this disclosure, all values within the range (including end points) and all subranges within the range are also disclosed. Those of ordinary skill in the art will also readily understand that, in different implementations of the features of this disclosure, reasonably different engineering tolerances, precision, and/or accuracy (for example with respect to numerical value(s)) may be applicable and suitable for obtaining the desired result. As an example, variations may be introduced when sign panels are manufactured by passing precursor material(s) through a flat-bed laminator or the like. Those of ordinary skill in the art will understand that, in such a manufacturing process, typically there are engineering tolerances comprising permissible limits in variations of dimensions, and the tolerances can vary in different circumstances. Accordingly, it is believed those of ordinary skill will readily understand usage herein of the terms such as "substantially," "about," "approximately," and the like.

As non-limiting examples, the term "about" can indicate that a numeric value can vary by plus or minus 25%, for example plus or minus 20%, for example plus or minus 15%, for example plus or minus 10%, for example plus or minus 5%, for example plus or minus 4%, for example plus or minus 3%, for example plus or minus 2%, for example plus or minus 1%, for example plus or minus less than 1%, for example plus or minus 0.5%, for example plus or minus 0.1%, including all values and subranges therebetween for each of the above ranges.

The use of the term "and/or" includes any and all combinations of one or more of the associated listed items. The exemplary figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

What is claimed is:

1. A method of making a sheet material comprising:
   applying pressure to first and second opposite sides of a precursor foam sheet material comprising a polypropylene-based polymer and concurrently heating the precursor foam sheet material at a temperature at or above a temperature sufficient to relax and/or destress the polypropylene-based polymer and/or the precursor foam sheet material and less than a melting temperature of the polypropylene-based polymer to form a heated foam sheet material comprising the polypropylene-based polymer; and
   cooling the heated foam sheet material comprising the polypropylene-based polymer to form a heat treated foam sheet material comprising the polypropylene-based polymer.

2. The method of claim 1, wherein the heating of the precursor foam sheet material is comprised of heating the precursor foam sheet material at a temperature ranging from about 5° F. to about 50° F. below the melting temperature of the polypropylene-based polymer.

3. The method of claim 2, wherein the heating of the precursor foam sheet material is comprised of heating the precursor foam sheet material at a temperature ranging from about 270° F. to about 300° F.

4. The method of claim 1, comprising directing the precursor foam sheet material along a generally linear material path during concurrently applying pressure to and heating of the precursor foam sheet material.

5. The method of claim 1, comprising directing the precursor foam sheet material along an undulating material path having alternating upward and downward portions during concurrently applying pressure to and heating of the precursor foam sheet material.

6. The method of claim 1, wherein the cooling of the heated foam sheet material is comprised of applying pressure to first and second opposite sides of the heated foam sheet material during the cooling step.

7. The method of claim 1, comprising:
   directing the precursor foam sheet material between an upper continuous belt and a lower continuous belt of a dual belt lamination system, the upper and lower continuous belts cooperating to support and advance the precursor foam sheet material through the lamination system;
   wherein the concurrently applying of pressure to and heating of the precursor foam sheet material is comprised of advancing the upper and lower continuous belts supporting the precursor foam sheet material through a heating zone, the advancing comprising:
     applying pressure to the opposite sides of the precursor foam sheet material as the precursor foam sheet material advances through the heating zone; and
     concurrently heating the precursor foam sheet material at a temperature at or above a temperature sufficient to relax and/or destress the polypropylene-based polymer and/or the precursor foam sheet material and less than a melting temperature of the polypropylene-based polymer to form the heated foam sheet material comprising the polypropylene-based polymer; and
   wherein the cooling of the heated foam sheet material is comprised of, after concurrently applying pressure to and heating of the precursor foam sheet material, advancing the upper and lower continuous belts supporting the heated foam sheet material through a cooling zone to cool the heated foam sheet material to form the heat treated foam sheet material comprising the polypropylene-based polymer.

8. The method of claim 7, wherein the concurrently applying pressure to and heating of the precursor foam sheet material is comprised of the upper and lower continuous belts applying pressure to the opposite sides of the precursor foam sheet material as the precursor foam sheet material advances through the heating zone.

9. The method of claim 7, wherein the advancing of the upper and lower continuous belts supporting the precursor foam sheet material through the heating zone is comprised of advancing the upper and lower continuous belts supporting the precursor foam sheet material along an undulating path having alternating upward and downward portions relative to an averaged centerline of a precursor foam sheet material path through the heating zone.

10. The method of claim 7, wherein:
    the lamination system includes a series of a plurality of pairs of plates along a machine direction of the heating zone, each pair of the plurality of pairs of plates including an upper plate and an opposite lower plate defining a gap; and
    the advancing of the upper and lower continuous belts supporting the precursor foam sheet material through the heating zone is comprised of advancing the upper and lower continuous belts supporting the precursor foam sheet material along a path through the gaps between the upper and lower plates of the plurality of pairs of plates.

11. The method of claim 10, comprising:
    adjusting vertical positions of alternating pairs of the plurality of pairs of plates upwardly and downwardly so that a serial arrangement of gaps between the upper and lower plates of the alternating pairs of the plurality of plates alternate between positions above and positions below an averaged centerline of a precursor foam sheet material path through the heating zone to form an undulating path having alternating upward and downward portions relative to the averaged centerline of the precursor foam sheet material path, wherein the advancing of the upper and lower continuous belts supporting the precursor foam sheet material through the heating zone is comprised of advancing the upper and lower continuous belts supporting the precursor foam sheet material along the undulating path having alternating upward and downward portions relative to the averaged centerline of the precursor foam sheet material path.

12. The method of claim 11, comprising applying pressure to the opposite sides of the precursor foam sheet material as the precursor sheet material advances through the heating zone along the undulating path having alternating upward and downward portions relative to the averaged centerline of the precursor material path.

13. The method of claim 1, wherein the concurrently applying of pressure to and heating of the precursor foam sheet material comprises expanding the thickness of the precursor foam sheet material about 10% to about 35%.

14. The method of claim 1, wherein the precursor foam sheet material comprises a polypropylene-based foam layer.

15. The method of claim 1, wherein the precursor foam sheet material comprises:
a first polypropylene-based polymer film layer having a first side and a second side opposite one another; and
a polypropylene-based foam layer in a facing relationship with the first side of a first polypropylene-based polymer film layer.

16. The method of claim 15, wherein the precursor foam sheet material comprises a second polypropylene-based polymer film layer and the polypropylene-based foam layer is between the first polypropylene-based polymer film layer and the second polypropylene-based polymer film layer.

17. The method of claim 16, wherein the precursor foam sheet material comprises:
a first polypropylene-based bonding layer between and joining the polypropylene-based foam layer and the first polypropylene-based polymer film layer; and
a second polypropylene-based bonding layer between and joining the polypropylene-based foam layer and the second polypropylene-based polymer film layer.

\* \* \* \* \*